(12) United States Patent
Takai et al.

(10) Patent No.: US 6,272,071 B1
(45) Date of Patent: Aug. 7, 2001

(54) SPEED MEASURING APPARATUS

(75) Inventors: Takuo Takai; Fumio Ikeuchi, both of Tottori (JP)

(73) Assignee: Ricoh Microelectronics Co., Ltd., Tottori (JP)

( * ) Notice: Subject to any disclaimer, the term of this patent is extended or adjusted under 35 U.S.C. 154(b) by 0 days.

(21) Appl. No.: 09/199,820

(22) Filed: Nov. 25, 1998

(30) Foreign Application Priority Data

Nov. 26, 1997 (JP) .................................... 9-340669
Mar. 26, 1998 (JP) .................................... 10-098411
Apr. 22, 1998 (JP) .................................... 10-128319
Jun. 29, 1998 (JP) .................................... 10-198012

(51) Int. Cl.$^7$ ...................................................... G01S 15/00
(52) U.S. Cl. ................................................................ 367/90
(58) Field of Search ................................. 367/90, 98, 903

(56) References Cited

U.S. PATENT DOCUMENTS

| | | |
|---|---|---|
| 3,671,927 | 6/1972 | Proudian et al. . |
| 3,953,823 * | 4/1976 | Katakura ................................ 367/90 |
| 4,353,004 | 10/1982 | Kleinschmidt et al. . |
| 5,177,691 | 1/1993 | Welles et al. . |
| 5,260,910 * | 11/1993 | Panton ................................... 367/98 |

OTHER PUBLICATIONS

M.S. Kassam, et al., Ultrasonics Symposium Proceedings, vol. 1, pp. 780–784, "Directional CW Doppler Ultrasound Using a Double Heterodyne Demodulator," Nov. 5–7, 1980.

M. I. Skolnik, McGraw–Hill, "Introduction to Radar Systems," 1980.

Patent Abstracts of Japan, vol. 018, No. 048 (P–1682), Jan. 25, 1994, JP 05 273346, Oct. 22, 1993.

* cited by examiner

Primary Examiner—Daniel T. Pihulic
(74) Attorney, Agent, or Firm—Oblon, Spivak, McClelland, Maier & Neustadt, P.C.

(57) ABSTRACT

A speed measuring apparatus including a transmitter for transmitting an acoustic reference wave toward a moving-target, the acoustic reference wave being generated based on a reference signal with a predetermined frequency. Also included is a receiver for receiving acoustic reflection waves which are generated by the transmitted acoustic reference wave being reflected by the moving-target, for converting the acoustic reflection waves to receiver signals, and for outputting the receiver signals therefrom. Further, a signal attenuating unit for selectively attenuating a signal component with the same frequency as the frequency of the reference signal in the receiver signals which are output from the receiver and outputting signals therefrom and a band pass filter unit for selecting at least one Doppler signal component from the signals output from the signal attenuating unit are included. Also included is a speed computing unit for computing the speed of the moving-target relative to the speed measuring apparatus, based on the Doppler signal component abstracted by the band pass filter unit.

16 Claims, 16 Drawing Sheets

SPEED MEASURING APPARATUS

BACKGROUND OF THE INVENTION

1. Field of the Invention

The present invention relates to a speed measuring apparatus for measuring the speed of a moving-target relative to the speed measuring apparatus, based on a frequency of a Doppler signal component selected from receiver signals corresponding to acoustic waves reflected from the moving-target.

2. Discussion of Background

Conventionally, a speed measuring method of this kind is theoretically known, which can be conducted by the steps of transmitting toward a moving-target an acoustic wave generated based on a reference signal with a predetermined frequency, receiving an acoustic wave reflected by the moving-target, of which frequency is changed from that of the transmitted acoustic wave by the Doppler effect, and determining the speed of the moving-target based on a change in the frequency of the transmitted acoustic wave.

However, in order to measure the speed of a moving-target which is small in size or is positioned far away from the observer, it will be necessary to implement countermeasures of increasing the transmission level of the acoustic wave which is generated based on the reference signal, and/or increasing the amplification degree of an acoustic wave receiving circuit.

However, when such countermeasures are implemented, there is the risk that normal signal processing cannot be performed. This is because it may occur that an acoustic wave with the same frequency as the frequency of the reference signal, which has a greater level than that of the acoustic wave reflected by the moving-target, travels from a wave transmitting unit and directly enters a wave receiving unit by diffraction, or the wave receiving unit receives reflection waves from fixed objects, which are positioned near the moving-target and are not subjected to the Doppler effect, whereby signal processing circuits such as amplifiers and/or mixers of the wave receiving circuits are saturated.

FIG. 12 is a block diagram of an example of a speed measuring apparatus that can be constructed based on the above-mentioned conventional speed measuring theory.

FIG. 13 is a diagram in explanation of the dynamic ranges, namely the permissible input ranges, of a pre-amplifier and a mixer for use in the example shown in FIG. 12.

The example shown in FIG. 12 is provided with an ultrasonic wave transmitting section 10 comprising a transmitting unit 11, an ultrasonic wave receiving section 20 comprising a receiving unit 21, and a signal processing section 30.

The ultrasonic wave receiving section 20 further comprises a pre-amplifier 22 and a mixer 23 in addition to the receiving unit 21.

As shown in FIG. 13, when a voltage amplification degree (gain) of the pre-amplifier 22 is 200 times, a noise level of the mixer 23 is 2 mV, and a saturation level of each of the pre-amplifier 22 and the mixer 23 is 1 V, the mixer 23 has a dynamic range (DRmix) of 2 mV to 1 V, and the pre-amplifier 22, viewed from the side of the mixer 23, has a relative dynamic range (DRamp) of 10 $\mu$V to 5 mV. Therefore, a lower limit of an input level of the pre-amplifier 22, by which an ultrasonic wave reflected by a moving-target and subjected to Doppler shift can be processed, is 10 $\mu$V, while the permissible input level of the pre-amplifier 22 for the ultrasonic waves which travel from the transmitting unit 11 and directly enters the receiving unit 21 and for the ultrasonic waves reflected by fixed objects is less than 5 mV.

In this example, if a gain Gamp of the pre-amplifier 22 is increased, for example, to 400 times, the permissible input level of the pre-amplifier 22 is reduced to a half, that is, to less than 2.5 mV, so that it is necessary to implement some countermeasures, such as reducing the level of the ultrasonic wave emitted from the transmitting unit 11 to a half, or reducing the direct entering of the ultrasonic wave from the transmitting unit 11 to the receiving unit 21. Therefore, it is considered that it is extremely difficult to measure the speed of the moving-target which is small in size or is positioned far away from the observer.

Furthermore, in the case where there are foreign objects near the moving-target of which speed is to be measured, and the foreign objects are moving at different speeds from that of the moving-target, it is extremely difficult to measure only the speed of the moving-target, since Doppler-shifted acoustic waves are reflected not only by the moving-target, but also by the foreign objects. For instance, when the speed of a ball thrown by a pitcher in baseball is to be measured, a Doppler-shifted acoustic wave is reflected by the ball itself and various Doppler-shifted acoustic waves are reflected by various parts of the body of the pitcher, and those Doppler-shifted acoustic waves are mixed and received, so that it is extremely difficult to measure only the speed of the ball.

SUMMARY OF THE INVENTION

It is therefore an object of the present invention to provide a speed measuring apparatus which is capable of measuring the speed of a moving-target relative to the speed measuring apparatus, which moving-target is small in size and/or positioned far away from the measuring apparatus, even when an acoustic wave transmitted by acoustic wave transmitting means of the speed measuring apparatus directly enters acoustic wave receiving means by diffraction, or even when the acoustic wave receiving means receives acoustic waves reflected by fixed objects near the moving-target, which speed measuring apparatus is also capable of selectively measuring the speed of the moving-target even when near the moving-target there is a plurality of moving objects which move at different speeds from the speed of the moving-target and different acousticwaves reflected by the moving objects reach the speed measuring apparatus.

The above object of the present invention can be achieved by a speed measuring apparatus comprising:

transmitting means for transmitting an acoustic reference wave toward a moving-target, the acoustic reference wave being generated based on a reference signal with a predetermined frequency;

receiving means for receiving acoustic reflection waves which are generated by the transmitted acoustic reference wave being reflected by the moving-target, converting the acoustic reflection waves to receiver signals, and outputting the receiver signals therefrom;

signal attenuating means for selectively attenuating a signal component with the same frequency as the frequency of the reference signal in the receiver signals which are output from the receiving means and outputting signals therefrom;

band pass filter means for abstracting at least one Doppler signal component from the signals output from the signal attenuating means; and speed computing means for computing the speed of the moving-target relative to the speed measuring apparatus, based on the Doppler signal component abstracted by the band pass filter means.

In the above-mentioned speed measuring apparatus, by use of the signal attenuating means, it is possible to selectively attenuate the signal component with the same frequency as the frequency of the reference signal, corresponding to the acoustic wave which directly enters the receiving means from the transmitting means by diffraction, and/or the acoustic waves reflected by the fixed objects near the moving-target. Therefore, the above-mentioned speed measuring apparatus is capable of increasing the acoustic pressure of the acoustic wave transmitted by the transmitting means and the signal amplification degree of the receiving means, and therefore is capable of measuring the speed of the moving-target which is small in size and/or positioned far away from the speed measuring apparatus.

Furthermore, in the above-mentioned speed measuring apparatus, by use of the band pass filter means, it is possible to selectively measure the speed of the moving-target even when near the moving-target there is a plurality of moving objects which move at different speeds from the speed of the moving-target and different acoustic waves reflected by the moving objects reach the speed measuring apparatus, because the Doppler signal component of the acoustic wave reflected by the moving-target can be selectively abstracted by the band pass filter means.

The above object of the present invention can also be achieved by a speed measuring apparatus comprising:

transmitting means for transmitting an acoustic reference wave toward a moving-target, the acoustic reference wave being generated based on a reference signal with a predetermined frequency;

receiving means for receiving acoustic reflection waves which are generated by the transmitted acoustic reference wave being reflected by the moving-target, converting the acoustic reflection waves to receiver signals, and outputting the receiver signals;

band pass filter means for abstracting at least one Doppler signal component from the receiver signals output from the receiving means; and speed computing means for computing the speed of the moving-target relative to the speed measuring apparatus, based on the Doppler signal component abstracted by the band pass filter means.

In the above-mentioned speed measuring apparatus, by use of the band pass filter means, it is possible to selectively attenuate the signal components with the same frequency as the frequency of the reference signal, corresponding to the acoustic wave which directly enters the receiving means from the transmitting means by diffraction, and/or corresponding to the acoustic waves reflected by the fixed objects near the moving-target. Furthermore, by use of the band pass filter means, the Doppler signal component of the acoustic wave reflected by the moving-target can be selectively abstracted, even when near the moving-target there is a plurality of moving objects which move at different speeds from the speed of the moving-target and different acoustic waves reflected by the moving objects reach the speed measuring apparatus, so that it is possible to increase the acoustic pressure of the acoustic wave transmitted by the transmitting means and the signal amplification degree of the receiving means and accordingly to selectively measure the speed of the moving-target even when the moving-target is small in size and/or positioned far away from the speed measuring apparatus.

In any of the above-mentioned speed measuring apparatus, the band pass filter means may comprise at least one band pass filter which selectively allows the Doppler signal component to pass therethrough. Alternatively, the band pass filter means may be constructed so as to comprise a plurality of such band pass filters which are connected in parallel.

In the above-mentioned speed measuring apparatus, since at least one Doppler signal can be selectively abstracted by use of the above-mentioned band pass filter means, the speed measuring apparatus is capable of selectively measuring the speed of the moving-target.

Furthermore, when a plurality of the band pass filters is connected in parallel and the pass band of each band pass filter is set narrow, it is expected that the S/N ratio and the measurement accuracy of the speed of the moving-target can be increased.

In any of the above-mentioned speed measuring apparatus, the transmitting means may comprise (a) a transmitting unit for transmitting the acoustic reference wave toward the moving-target, (b) a capacitor connected to the transmitting unit in parallel therewith, and (c) an inductive impedance element, thereby constituting a serial resonance circuit, with an inductance of the inductive impedance element being set in such a manner that a resonance frequency of the serial resonance circuit is equal to the frequency of the reference signal.

In the above-mentioned speed measuring apparatus, even when the capacitance of the transmitting unit varies depending upon the ambient conditions thereunder, the resonance frequency of the serial resonance circuit is difficult to vary, so that variations in the levels of signals applied to the transmitting unit are reduced. Accordingly, the variation in the acoustic pressure of the acoustic wave transmitted by the transmitting unit, depending upon the ambient conditions thereunder, can be minimized.

The above object of the present invention can also be achieved by a speed measuring apparatus comprising:

transmitting means for transmitting an acoustic reference wave toward a moving-target, the acoustic reference wave being generated based on a reference signal with a predetermined frequency;

receiving means for receiving acoustic reflection waves which are generated byt the transmitted acoustic reference wave being reflected by the moving-target, converting the acoustic reflection waves to receiver signals, and outputting the receiver signals;

analog-to-digital convert means for converting the receiver signals output from the receiving means to digital data, and outputting the digital data; and digital signal processing means for abstracting at least one Doppler signal component from the digital data output from the analog-to-digital convert means and computing the speed of the moving-target relative to the speed measuring apparatus, based on the Doppler signal component abstracted.

In the above-mentioned speed measuring apparatus, the receiver signals output from the receiving means is converted to digital data by the analog-to-digital convert means, and from the digital data output from the analog-to-digital convert means, at least one Doppler signal component is abstracted and the speed of the moving-target relative to the speed measuring apparatus is computed, based on the Doppler signal component abstracted by the digital signal processing means, in accordance with a program stored in the digital signal processing means, which digital signal processing means performs the same function as that of the signal attenuating means, the same function as that of the band pass filter means as well as the same function as that of the speed computing means as in the first-mentioned speed measuring apparatus.

Thus, the circuits for the speed measuring apparatus can be simplified. Furthermore, by changing only the program stored in the digital signal processing means, for instance, the attenuating characteristics corresponding to the signal attenuating means, and the band pass filtering characteristics corresponding to the band pass filter means can be easily changed as desired.

In the above-mentioned speed measuring apparatus, the transmitting means may comprise (a) a transmitting unit for transmitting the acoustic reference wave toward the moving-target, (b) a capacitor connected to the transmitting unit in parallel therewith, and (c) an inductive impedance element, thereby constituting a serial resonance circuit, with an inductance of the inductive impedance element being set in such a manner that a resonance frequency of the serial resonance circuit is equal to the frequency of the reference signal.

In the above-mentioned speed measuring apparatus, even when the capacitance of the transmitting unit varies depending upon the ambient conditions thereunder, the resonance frequency of the serial resonance circuit is difficult to vary, so that variations in the levels of signals applied to the transmitting unit are reduced. Accordingly, the variation in the acoustic pressure of the acoustic wave transmitted by the transmitting unit, depending upon the ambient conditions thereunder, can be minimized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 15 is a block diagram of an example of a wave receiving amplifier which is referred to as a wave receiving amplifier 20a.

FIG. 17 is a block diagram of a band pass signal output portion 60a.

DESCRIPTION OF THE PREFERRED EMBODIMENTS

A speed measuring apparatus of the present invention will now be explained, which is capable of measuring the speed of a moving-target, such as a ball used in base ball, relative to the measuring apparatus, utilizing the Doppler effect of an ultrasonic wave reflected by the moving-target.

Other features of this invention will become apparent in the course of the following description of exemplary embodiments, which are given for illustration of the invention and are not intended to be limiting thereof.

EXAMPLE 1

Figure 1:
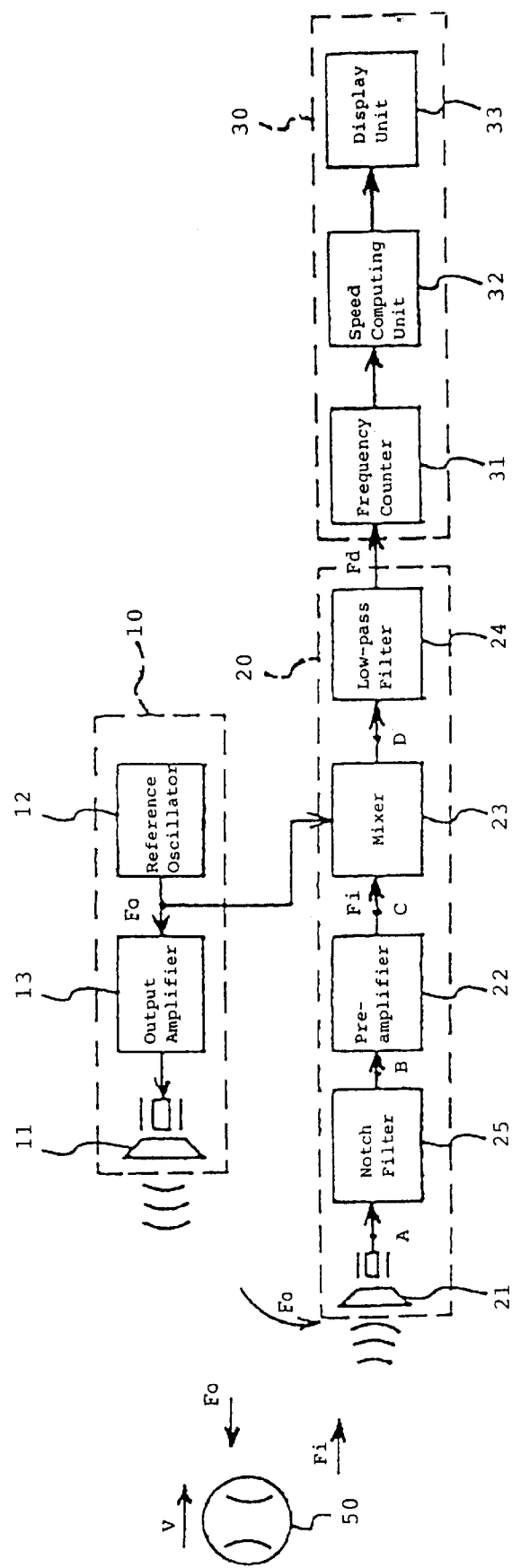
FIG. 1 is a block diagram of a speed measuring apparatus No. 1 of the present invention.

FIG. 1 is a block diagram of a speed measuring apparatus No. 1 of the present invention, which comprises an ultrasonic wave transmitting section 10, an ultrasonic wave receiving section 20, and a signal processing section 30.

The ultrasonic wave transmitting section 10 transmits an ultrasonic wave generated in a transmitting unit 11, based on a reference signal with a predetermined frequency Fo, toward a ball 50 that is approaching the speed measuring apparatus at a moving speed V. The ultrasonic wave transmitting section 10 comprises the transmitting unit 11 comprising an ultrasonic transducer which converts an electric signal to an ultrasonic wave, a reference oscillator 12 which generates a reference signal with the predetermined frequency Fo, and an output amplifier for amplifying the reference signal to such a level that is necessary for driving the transmitting unit 11 in operation.

The above-mentioned ultrasonic wave receiving section 20 receives ultrasonic waves reflected by the above ball 50 and converts the reflected ultrasonic waves to receiver signals and abstracts a Doppler signal component from the receiver signals. The ultrasonic wave receiving section 20 comprises a receiving unit 21 comprising, for instance, an ultrasonic transducer for converting the ultrasonic waves to electric receiver signals, a pre-amplifier 22 for amplifying the receiver signals output from the receiving unit 21, a mixer for mixing (a) the receiver signals containing a reflection wave signal component with a frequency Fi output from the amplifier 22 and (b) the above-mentioned reference signal with the frequency Fo, and a low-pass filter 24 which selectively allows the Doppler shift component (the difference between the reflection wave signal components and the reference signal: Frequency Fd) from the signals output from the mixer 23.

Between the receiving unit 21 and the pre-amplifier 22, there is interposed a notch filter 25 which serves as a band rejection filter with a center frequency thereof being set so as to be the same as the frequency Fo of the reference signal. The notch filter 25 is composed of, for instance, a low-pass filter and a high-pass filter which are combined in parallel, with an identical cut-off frequency, and is capable of providing characteristics with a relatively high selectivity (Q). The attenuation degree of the reference signal component by the notch filter 25 is set in such a manner that a predetermined signal processing can be performed in the circuits at a later step. For instance, the attenuation degree is set based on a maximum permissible input level for the reference signal components of the pre-amplifier 22 and the mixer 23. More specifically, when the gain of the pre-amplifier 22 is 400 times, and the maximum permissible output level (amplification) is 4Vpp, if the level of the reference signal component in the receiver signals input from the receiver unit 21 to the pre-amplifier 22 is greater than 10 mVpp, the pre-amplifier 22 is saturated, so that the attenuation ratio of the notch filter 25 is set in such a manner that the level of the reference signal component can be reduced to less than 10 mVpp by the notch filter 25. When the maximum permissible input level of the mixer 23 is smaller than that of the pre-amplifier 22, the attenuation ratio of the notch filter 25 is set in such a manner that the level of the reference signal component input to the mixer 23 is less than the above-mentioned permissible input level, with the gain of the pre-amplifier 22 taken into consideration. In this case, the notch filer 25 may be interposed between the pre-amplifier 22 and the mixer 23, or may be before and after the pre-amplifier 22.

The above-mentioned signal processing section 30 comprises a frequency counter 31 for measuring the frequency Fd of the Doppler signal output from the above-mentioned low-pass filter 24, an computing unit 32 for computing the moving speed V of the ball 50, based on the measured frequency, and a display 33 for displaying the result of the measurement of the speed.

The computing unit 32 computes the moving speed V of the ball 50 based on the following formula (1):

$$Fd = 2 \cdot V \cdot Fo/(C-V) \quad (1)$$

wherein Fd and Fo are defined in the above and C is the speed of sound.

The above-mentioned signal processing section 30 may further comprise a temperature measuring unit for correcting the variations in the speed of sound depending upon the ambient temperature thereof. This correction can be performed based on the following formula (2):

$$C = 331.5 + 0.6 \cdot t \quad (2)$$

wherein t is the ambient temperature measured by the temperature measuring unit.

Figure 2:
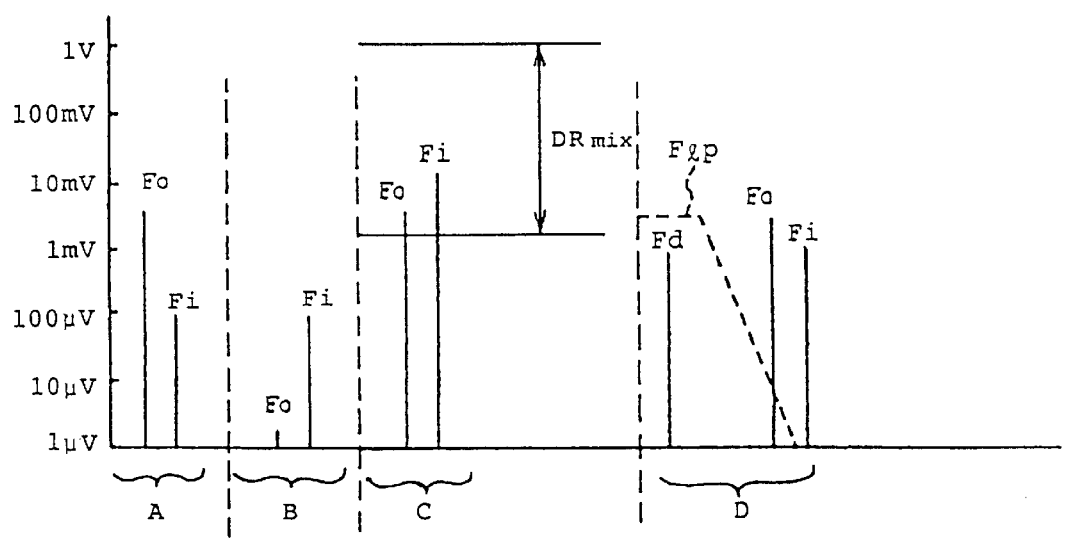
FIG. 2 is a diagram in explanation of the amplitudes (levels) of the signal components with frequencies of Fo, Fi and Fd in points A, B, C and D in an ultrasonic wave receiving section 20 in the speed measuring apparatus shown in FIG. 1.

FIG. 2 is a diagram in explanation of the amplitudes or levels of the signal components with frequencies of Fo, Fi and Fd in points A, B, C and D, which are respectively referred to as reference signal component Fo, reflection wave signal component Fi and Doppler shift component Fd (=Fi−Fo) In the diagram in FIG. 2, the range indicated by DRmix represents a dynamic range of the mixer 23, and the broken line indicated by Flp shows the characteristics of the low-pass filter 24.

In the speed measuring apparatus with the above-mentioned structure, the voltage amplification degree (gain) Gamp of the pre-amplifier 22 is set at 200 times, the noise level of the mixer 23 is set at 2 mV, the saturation level of the mixer 23 is set at 1 volt, and the attenuation ratio of the notch filter 25 with respect to the reference signal component is set at 1/200. In such structure, when the level of the reflection wave signal component Fi reflected by the ball 50 at point A in FIG. 1 is 100 μV, and the level of the reference signal component (Fo) by the direct transmission by diffraction of the acoustic wave from the transmitting unit 11 to the receiving unit 21 is 5 mV, the level of the reference signal component (Fo) at point B is attenuated to 25 μV (=5 mV/200) by the notch filter 25 and reaches 5 mV which is lower than the saturation level of the mixer 23 at point C which is after the pre-amplifier 22. In other words, in a conventional speed measuring apparatus which is not provided with such a notch filter, when the level of the reference signal component (Fo) at point B is 5 mV, the level of the reference signal component (Fo), at point C which is after the pre-amplifier 22, reaches the saturation level of 1 V of the mixer 23. In sharp contrast to this, when the notch filter is provided, the level of the reference signal component Fo is within a normal operation range for the mixer 23.

On the other hand, the reflection wave signal component (Fi) is not affected by the notch filter 25 and is amplified by the pre-amplifier 22 to 20 mV which is within the dynamic range DRmix. From the receiver signals output from the mixer 23 at point D, a Doppler shift component Fd is abstracted by the low-pass filter 24 with the characteristics represented by Flp in FIG. 2. The frequency Fd of the Doppler shift component Fd is counted by the frequency counter 31 of the signal processing section 30, whereby the speed V of the ball 50 is computed by the computing unit 32, and displayed in the display 33.

Figure 3A:
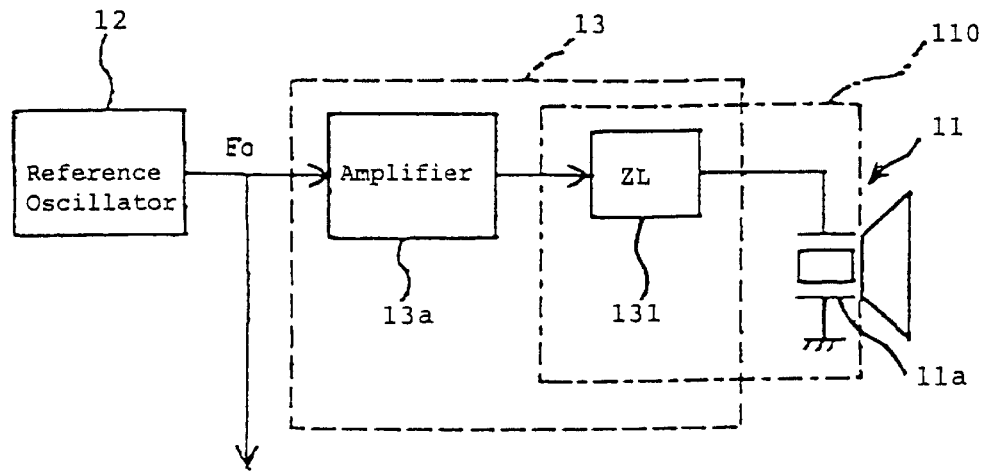
FIGS. 3(a) and 3(b) are diagrams in explanation of examples of the ultrasonic wave transmitting section 10.
Figure 3B:
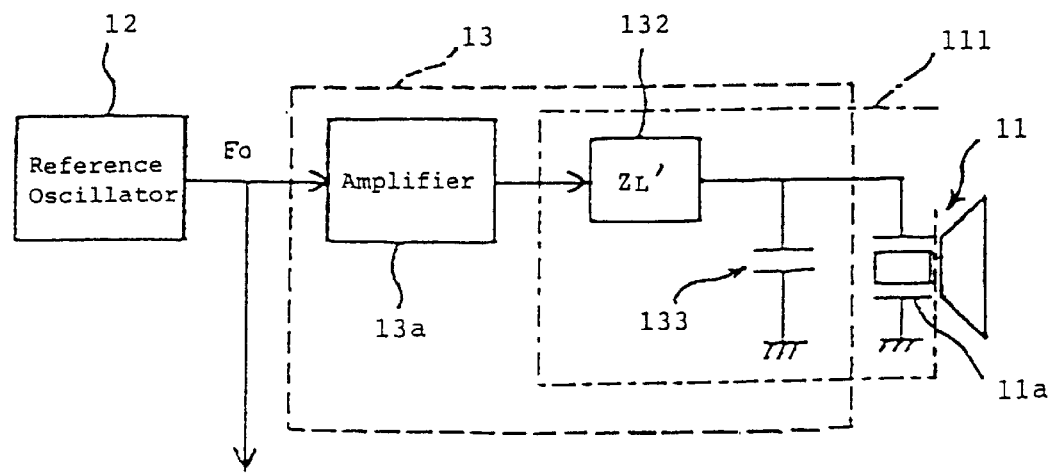

FIGS. 3(a) and 3(b) are diagrams in explanation of examples of the ultrasonic wave transmitting section 10.

In the example shown in FIG. 3(a), an output amplifier 13 comprises an amplifier 13a for amplifying the reference signal and an inductive impedance element 131 such as a coil which constitutes a serial resonance circuit 110 in combination with an ultrasonic wave transducer 11a of the transmitting unit 11.

The resonance frequency of the serial resonance circuit 110 is set at the same frequency as that of the reference signal so as to attenuate or reject signals other than the signal with the same frequency as that of the reference signal, contained in the signals output from the amplifier 13a, whereby the ultrasonic wave transducer 11a is driven by the reference signal which is substantially in the form of a sine wave.

In the ultrasonic wave transmitting section in FIG. 3(a), the serial resonance circuit 110 comprises the inductive impedance element 131 and the ultrasonic wave transducer 11a connected in series thereto. The resonance frequency f1 of the serial resonance circuit 110 is represented by the following formula (3):

$$f1 = \frac{1}{2\pi\sqrt{L1 \cdot Cs}} \quad (3)$$

wherein Cs is the capacitance of the ultrasonic wave transducer 11a, and L1 is the inductance of the inductive impedance element 131.

Furthermore, in the above, the inductance L1 of the inductive impedance element 131 is set in such a manner that the resonance frequency f1 of the serial resonance circuit 110 becomes the same as the frequency Fo of the reference signal. At this resonance frequency, the impedance of the serial resonance circuit 110 is minimized, so that the level of the signal which drives the ultrasonic wave transducer 11a is maximized.

A transducer portion of the ultrasonic wave transducer 11a is constructed with the provision of electrodes on a piezo-electric ceramic member, so that the capacitance Cs of the transducer portion varies depending upon the ambient conditions including the ambient temperature thereof. Therefore, it is considered that even if the resonance frequency f1 is set so as to be the same as the frequency Fo of the reference signal at room temperature, the resonance frequency f1 may be shifted from the frequency Fo of the reference signal depending upon the variation of the ambient temperature. If this takes place in fact, a sufficient signal level for driving the ultrasonic wave transducer 11a is not obtained, so that there is the risk that the level of the acoustic wave transmitted by the ultrasonic wave transducer 11a may become too small to be used.

In the example shown in FIG. 3(b), there is shown an improved example of the ultrasonic wave transmitting section 10 with respect to the lowering of the level of the acoustic wave transmitted as caused by the variation in the capacitance Cs of the ultrasonic wave transducer 11a, depending upon the above-mentioned ambient conditions. In the ultrasonic wave transmitting section 10, a capacitor 133 is connected in parallel with the ultrasonic wave transducer 11a. As the capacitor 133, there can be employed a capacitor whose capacitance is less changeable than the capacitance of the ultrasonic wave transducer 11a, depending upon the changes in the ambient temperature, for instance, a film capacitor. Furthermore, the inductance L2 of the inductive impedance element 132 is set in such a manner that the resonance frequency f2 of a serial resonance circuit 111, which is composed of the capacitor 133, an inductive impedance element 132 of the output amplifier 13, and the ultrasonic wave transducer 11a, is the same as the frequency Fo of the reference signal. In other words, the inductance L2 is set so as to satisfy the following formula (4):

$$f2 = \frac{1}{2\pi\sqrt{L2(C1+Cs)}} = F_0 \quad (4)$$

where C1 is the capacitance of the above-mentioned capacitor 133.

When the capacitor 133 is connected in parallel with the ultrasonic wave transducer 11a in the above-mentioned manner, the combined capacitance of the ultrasonic wave transducer 11a at the opposite ends thereof is C1+Cs. In view of the above formula (4), the resonance frequency f2 is inversely proportional to $\sqrt{C1+Cs}$. On the other hand, the resonance frequency f1 of the serial resonance circuit shown in FIG. 3(a) is inversely proportional to $\sqrt{Cs}$ in which Cs is the capacitance of the ultrasonic transducer 11a.

Therefore, in the serial resonance circuit as shown in FIG. 3(b), the capacitance Cs of the ultrasonic wave transducer 11a has a much less affect on the resonance frequency thereof than in the serial resonance circuit without the above-mentioned capacitor is not connected thereto as shown in FIG. 3(a). In other words, in the serial resonance circuit as shown in FIG. 3(b), even if the capacitance Cs of the transducer is varied by the changes in the ambient temperature, the changes in the ambient temperature have a much less affect on the resonance frequency. Thus, the level of the acoustic wave transmitted by the ultrasonic wave transducer 11a can be prevented from being reduced.

In order to effectively prevent the resonance frequency from being shifted, it is preferable that the capacitance C1 of the above-mentioned capacitor 133 be sufficiently larger than the capacitance Cs of the ultrasonic wave transducer 11a. More specifically, the inventors of the present invention have confirmed that an acoustic wave can be transmitted with a sufficiently high level in a stable manner when an ultrasonic wave transducer 11a with a capacitance Cs of 2400 pF at room temperature and a capacitor 133 with a capacitance of 22000 pF at room temperature are used.

Figure 4:
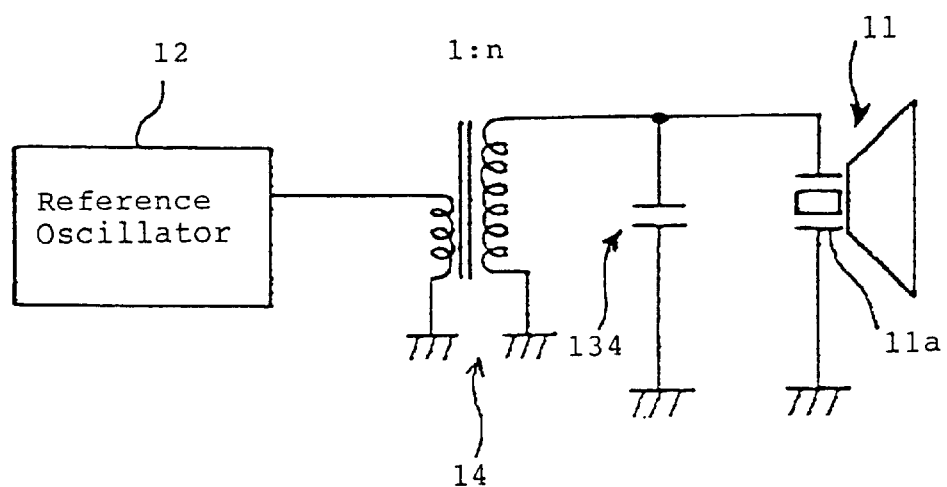
FIG. 4 is a diagram in explanation of a further example of the ultrasonic wave transmitting section 10.

FIG. 4 is a diagram in explanation of a further example of the ultrasonic wave transmitting section 10. In this example of the ultrasonic wave transmitting section 10, there is provided a transformer 14 for increasing the voltage of the reference signal output from the reference oscillator 12. The reference signal is input to a primary coil of the transformer 14. A secondary coil of the transformer 14 is connected to the ultrasonic wave transducer 11a. The turn ratio of the primary coil to the second coil of the transformer 14 is 1: n.

Furthermore, in this example of the ultrasonic wave transmitting section 10, the capacitor 134 is connected in parallel to the ultrasonic wave transducer 11a in order to prevent the reduction of the level of the transmitted acoustic wave by the capacitance Cs of the ultrasonic wave transducer 11a being varied by the changes in the ambient temperature, in the same manner as in the ultrasonic wave transmitting section 10 shown in FIG. 3(b). The level of the acoustic wave transmitted by the ultrasonic wave transducer 11a can be prevented from being reduced by setting an inductance L3 of one coil, viewed from the side of the secondary coil of the transformer 14, to which the transformer 14 is equalized, (hereinafter referred to as the inductance of the transformer 14), and the resonance frequency f3 of a serial resonance circuit which is composed of the above-mentioned transformer 14, the capacitor 134 with a capacitance C2 and the ultrasonic wave transducer 11a with a capacitance Cs so as to satisfy the following formula (5):

$$f3 = \frac{1}{2\pi\sqrt{L3(C2+Cs)}} = F_0 \quad (5)$$

In the example of the ultrasonic wave transmitting section 10, the signal level of the reference signal can be amplified by n times by the transformer 14 for voltage elevation, so that the reference signal can be amplified to a necessary level for driving the transmitting unit 11 by such a simple construction as shown in FIG. 4.

In the above speed measuring apparatus No. 1 of the present invention, the amplification degree of the pre-amplifier 22 and an upper limit level of the acoustic wave transmitted by the transmitting unit 11 can be increased under the conditions that the pre-amplifier 22 and the mixer 23 which are disposed after the notch filer 25 are not caused to reach their saturation levels, so that the speed measuring apparatus No. 1 of the present invention is capable of measuring the speed of the moving-target relative to the speed measuring apparatus No. 1 even if the moving-target is small in size or positioned far away from the speed measuring apparatus, the acoustic wave transmitted from the transmitting unit 11 directly enters the receiving unit 21 by diffraction without being reflected by anything, or there are ultrasonic waves reflected by fixed objects near the moving-target.

Figure 14:
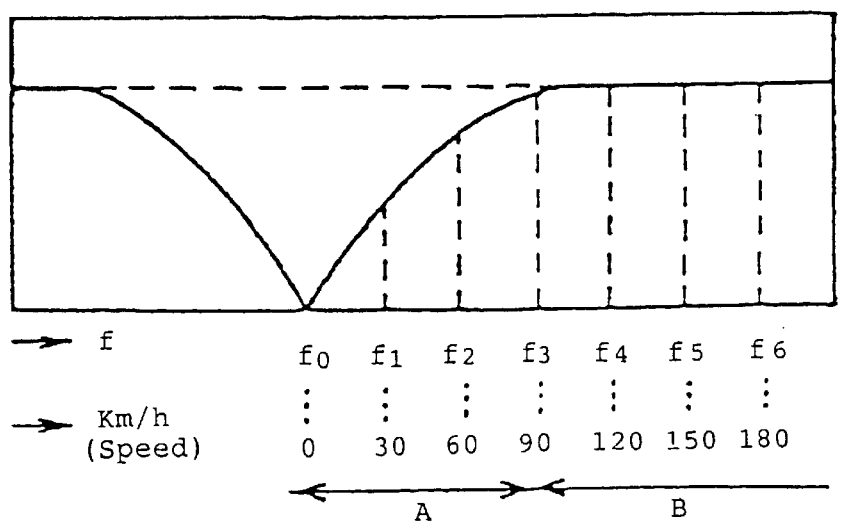
FIG. 14 is a diagram in explanation of the frequency characteristics of the output signals from a notch filter.

However, as shown in FIG. 14, when the speed of a moving-target with a low speed and with a relatively less Doppler shift with a frequency which is within a frequency range A in which the frequency Fi of the reflection wave signal component is near the frequency Fo, even if the direct entering of the acoustic wave from the transmitting unit 11 to the receiving unit 21 by diffraction is less, and the levels of the acoustic waves reflected by the fixed objects near the moving-target are lower than the level of the acoustic wave reflected by the moving-target, the reflection wave signal component is attenuated by the notch filter 25, so that in such a case, there is a problem that it is difficult to measure the speed of the moving-target with such a low speed.

Figure 15:
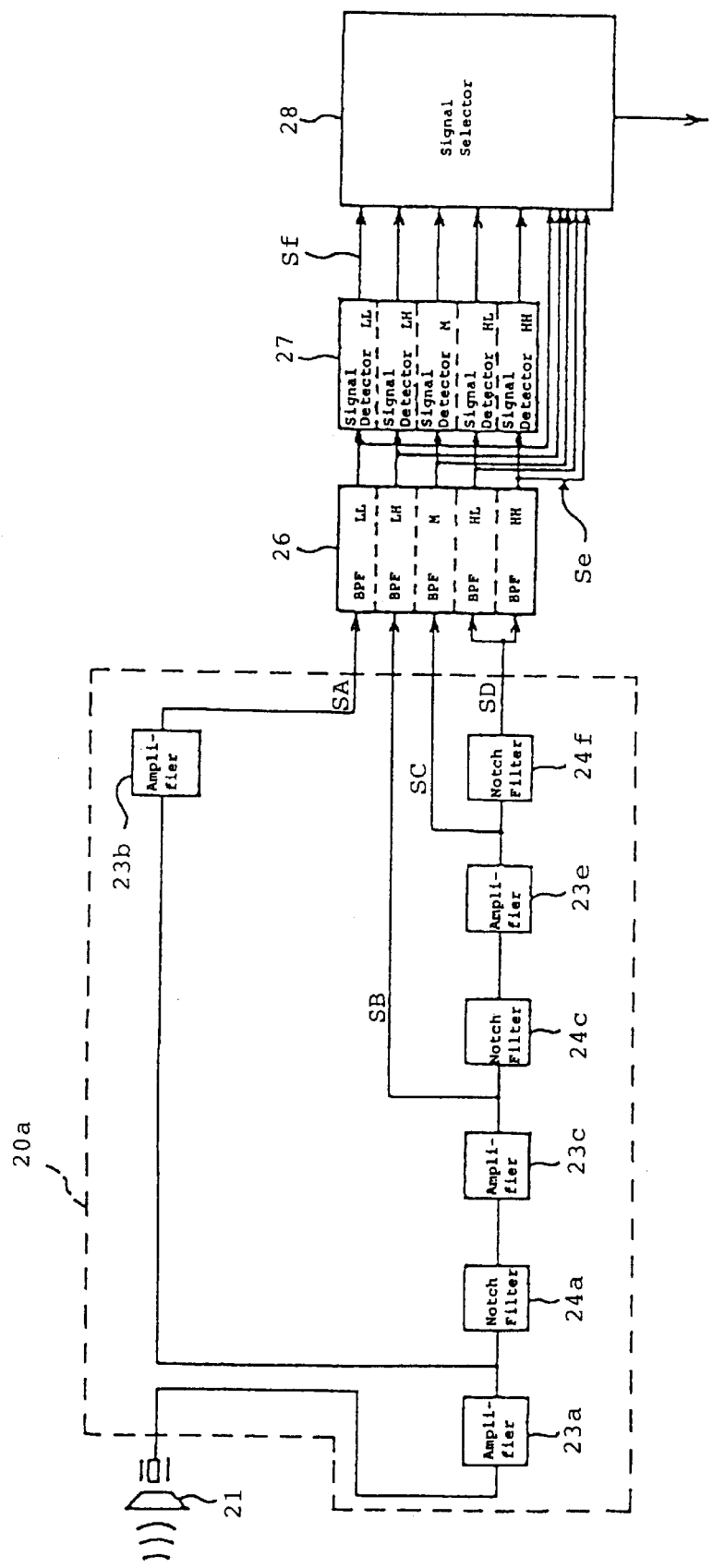
Figure 16:
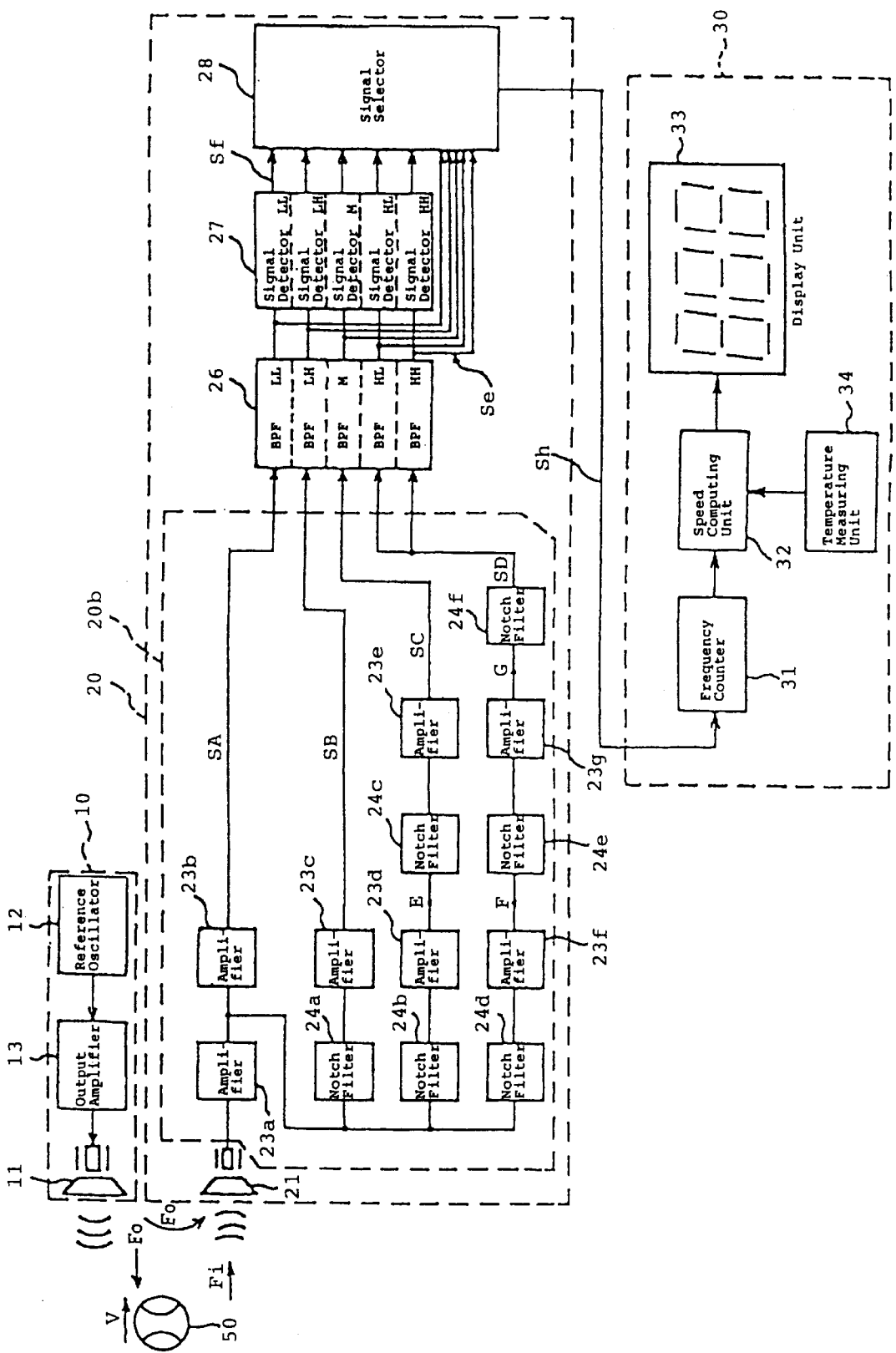
FIG. 16 is a block diagram of another example of the wave receiving amplifier which is referred to as a wave receiving amplifier 20b.

Such a problem, however, can be solved by the apparatus as shown in FIG. 15 and FIG. 16.

In such apparatus, a wave receiving amplifier 20a has such a circuit structure that outputs SA which does not pass through any notch filter, and outputs SB, SC and SD which pass through at least one notch filter. These output signals SA, SB, SC and SD are input to any band pass filter of a band pass filter group 26 which is composed of a plurality of different band pass filters, and when the structure of the apparatus is made in such a manner that such an output signal that passes through more notch filters is input to a band pass filter with a greater difference between a center frequency of the pass band and the frequency Fo of the reference signal, a Doppler signal can be obtained from the output from a less number of notch filters at the measurement of the speed of the moving-target with a low speed and with a relatively less Doppler shift.

EXAMPLE 2

Figure 5:
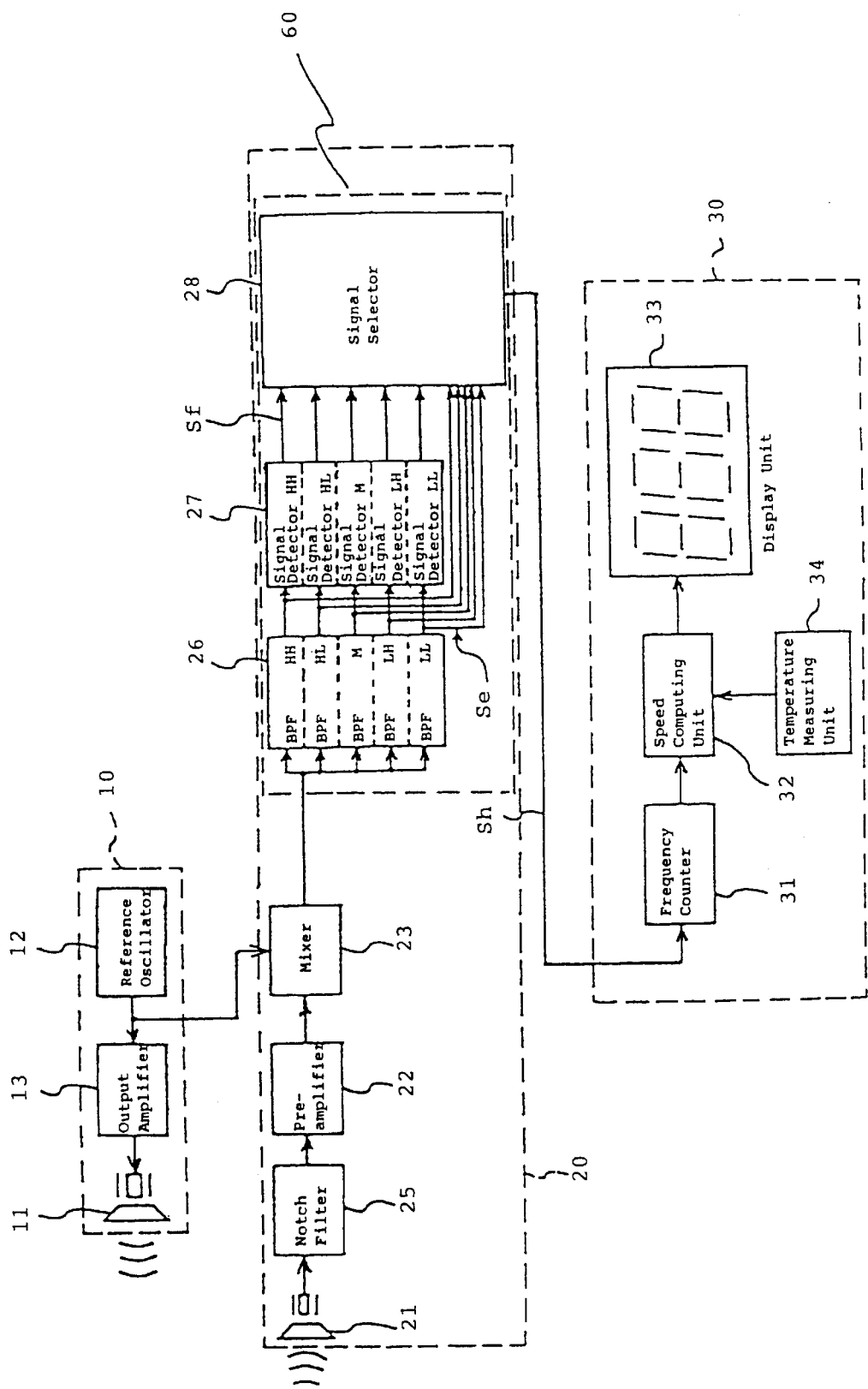
FIG. 5 is a block diagram of a speed measuring apparatus No. 2 of the present invention.

FIG. 5 is a block diagram of a speed measuring apparatus No. 2 of the present invention. In the speed measuring apparatus No. 2, the ultrasonic wave transmitting section 10, the ultrasonic wave receiving section 20 comprising the receiving unit 21, the notch filter 25, the pre-amplifier 22 and the mixer 23, and the signal processing section 30 are substantially the same as those in the speed measuring apparatus No. 1 of the present invention as shown in FIG. 1, so that the explanation thereof is omitted, provided that in the signal processing section 30 of the speed measuring apparatus No. 2, there is provided a temperature measuring unit 34 for the correction of the variations in the speed of sound depending upon the ambient temperature.

In the speed measuring apparatus No. 1 shown in FIG. 1, it is not always one Doppler-shifted reflection wave with one frequency component that enters the receiving unit 21. More specifically, when there is a single moving-target such as an approaching car or an approaching ball that is thrown and travels in the air, it is considered that the frequency component of the Doppler-shifted acoustic wave reflected by the moving-target is one, and the corresponding Doppler signal is substantially in the form of a sine wave.

Figure 6A:
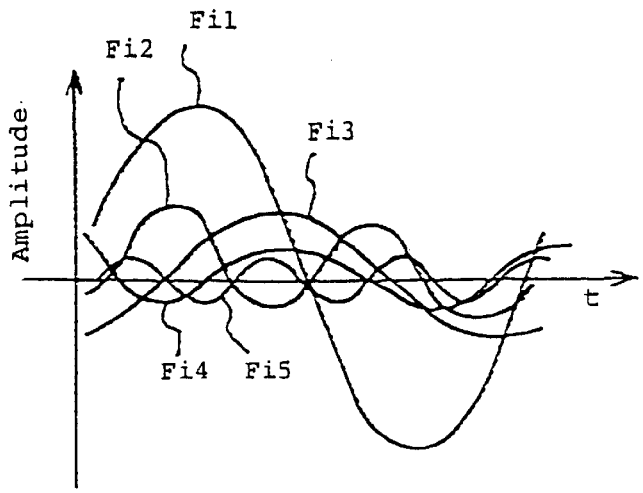
FIG. 6(a) is a diagram in explanation of wave forms of different Doppler-shifted reflection wave signal components Fi1 to Fi5 with different frequencies.
Figure 6B:
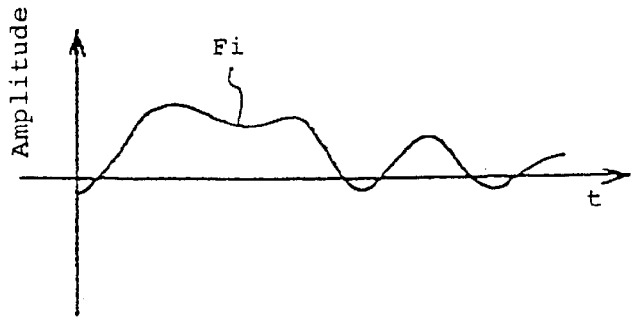
FIG. 6(b) is a diagram in explanation of a combined wave form of the different Doppler-shifted reflection wave signal components Fi1 to Fi5 with different frequencies.

However, for example, when an initial speed of a ball thrown by a pitcher in base ball is measured, acoustic waves containing different Doppler-shifted reflection wave signal components Fi1 to Fi5 with different frequencies are reflected not only by the ball itself, but by various parts of the body of the pitcher, such as arms and legs, as shown in FIG. 6(a), so that the wave form of receiver signal Fi is distorted as shown in FIG. 6(b) and therefore there is the risk that the frequency is erroneously counted.

In order to avoid this risk, the speed measuring apparatus No. 2 of the present invention is provided with divided band pass filter means in which the frequency band that can be assumed by the Doppler-shifted components is divided into a plurality of frequency bands, in place of the low-pass filter 24 which allows all the difference signal components Fd1 to Fd5 corresponding to the above-mentioned plurality of reflection signal components to pass therethrough.

The above-mentioned divided band pass filter means comprises a filter group 26 which is composed of, for example, 5 band pass filters, a detector group 27 composed of, for example, 5 signal detectors for detecting the levels of the signals which pass each of the band pass filters, and a signal selector 28 for selecting one of the signals output from each band pass filter based on the detection signals output from the detector group 27.

The band pass filter group 26 is composed of 5 divided pass bands (HH, HL, M, LH, LL) aligned in the order of a higher frequency to a lower frequency, separates the Doppler shift components output from the mixer 23 into each of band signals Se (SeHH to SeLL) and outputs the separated signals to both the signal detector group 27 and the signal selector 28.

Figure 6C:
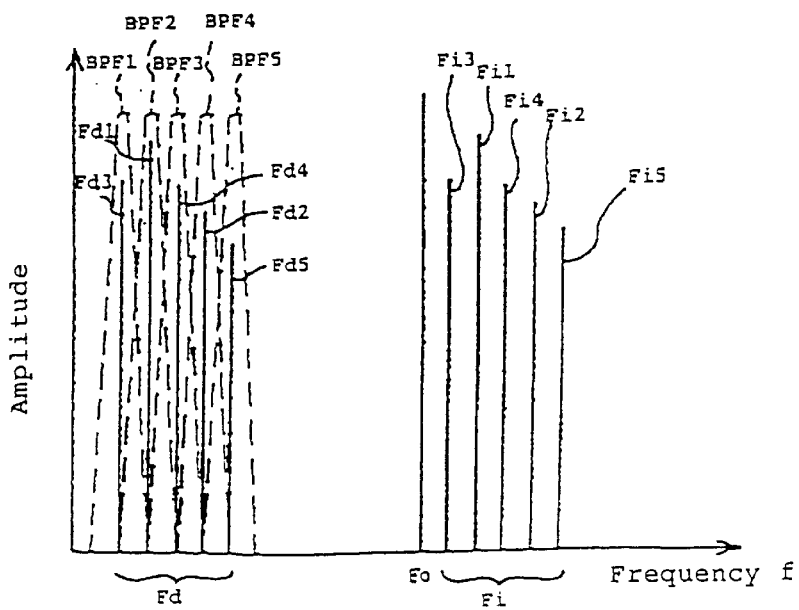
FIG. 6(c) is a diagram in explanation of the filter characteristics of a band pass filter group and input signals (Fo, Fi and Fd).

When the frequency Fo of the reference signal is set at 32.768 kHz, and the speed measuring range is set at 10 to 200 km/h, the frequency Fd of the Doppler shift components is in the range of 530 Hz to 12.5 kHz, so that the center frequencies of the above-mentioned 5 band pass filters BPF1 to BPF5 may be respectively set at 1.5 kHz, 3.5 kHz, 5.5 kHz, 9.5 kHz, and 11.5 kHz, with a pass band width being set at 2 kHz, with reference to FIG. 6(c). The number of the band pass filters BPF and the number of the signal detectors are not limited to 5, but may be set as desired in accordance with the desired speed measuring range and the measuring accuracy.

The signal detector group 27 compares the level of each band signal Se output from the band pass filter group 26 with a threshold value set in each signal detector of the signal detector group 27, and outputs a detection signal Sf to the signal detector 28 when the level of the band signal Se is found greater than the corresponding threshold value by the comparison of each band signal Se with the threshold value.

Even if a plurality of the detection signals Sf is output from the signal detector group 27 simultaneously, the signal selector 28 selects a desired one band signal Se and outputs as an output Sh to the frequency counter 31.

For example, when an initial speed of a ball 50 thrown by a pitcher in base ball is measured, it is considered that the Doppler-shifted frequency of the ball 50 is greater than any of the Doppler-shifted frequencies obtained from various parts of the body of the pitcher such as his arms and legs, so that the signal selector 28 selects a band signal Se with the highest frequency and outputs a signal Sh, whereby the signal processing section 30 displays the initial speed of the ball 50. A criterion for the selection in the signal selector 28 may be appropriately made in accordance with the objects of the speed measuring. For instance, when a lowest speed is measured, the selector 28 may be set so as to select a band signal Se with a lowest frequency. Furthermore, the detection signal Sf may be input to the signal processing section so that the signal processing section 30 may control the signal selector 28.

As to from which band pass filter BPF in the signal selector 28 a signal should be chosen, for instance, there may be the above-mentioned method of choosing a signal that has passed through the band pass filter BPF with the highest center frequency when a plurality of signals is output from the signal detector group 27 simultaneously in the above-mentioned example. Another may be a method of choosing a signal output first from the signal detector group 27.

The band pass filter group 26 shown in FIG. 5 comprises a desired plurality of band-divided band pass filters connected in parallel, so that each band pass filter comprises a pre-amplifier and an after-amplifier. Therefore, the band pass filter group 26 as shown in FIG. 5 has a problem that a larger circuit space is required as the band division number is increased.

Figure 17:
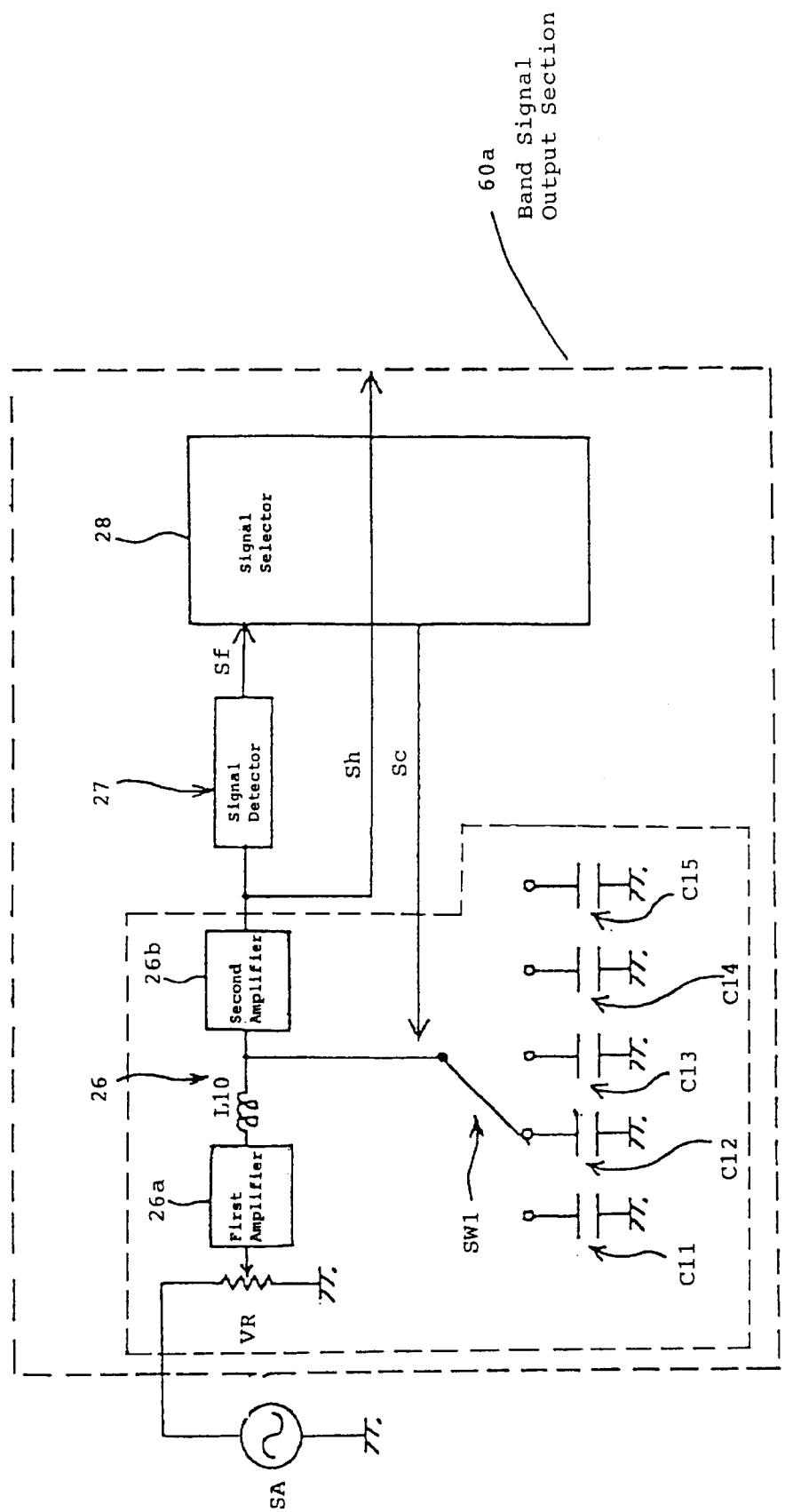

In order to solve this problem, the band pass filter group 26 can be constructed, using a coil L10, capacitors C11 to C15 corresponding to the desired band division number (for example, 5 in FIG. 17), and a switch SW1 for successively switching the capacitors C11 to C15, as shown in FIG. 17 which shows a band pass signal output portion 60a, whereby the same function as that of the band pass filter group 26 can be obtained and furthermore, a first amplifier 26a serving as the pre-amplifier, the coil L10, a second amplifier 26b serving as the after-amplifier, and a signal detector 27 can be used in common. Thus, the above-mentioned circuit space can be significantly saved.

Figure 7:
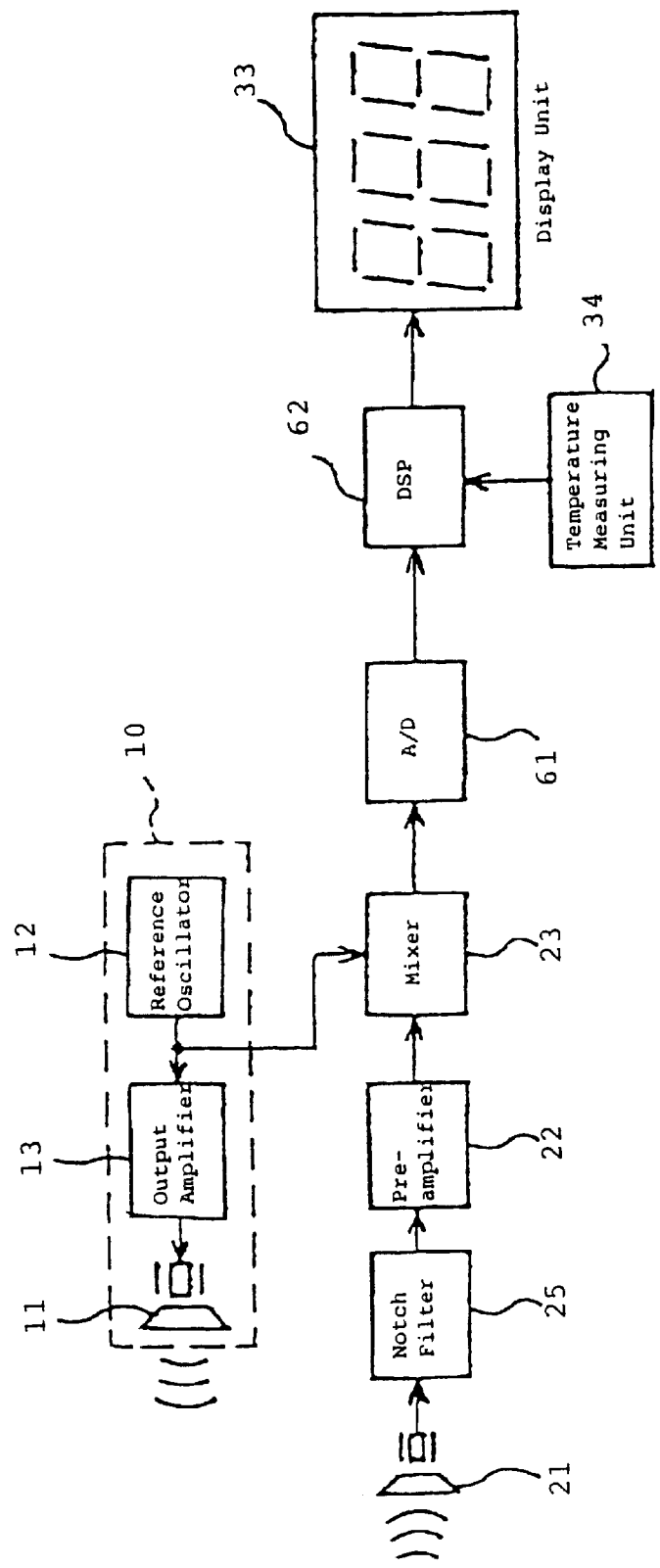
FIG. 7 is a block diagram of another example of the speed measuring apparatus No. 2 of the present invention.

FIG. 7 is a block diagram of another construction example of the above-mentioned speed measuring apparatus No. 2 of the present invention. In this speed measuring apparatus, the divided band pass filter means 60 and the signal processing section 30 shown in FIG. 5 are constructed of an analog/digital converter 61 (hereinafter referred to as the AD converter 61) which converts analog signals to digital signals and a digital signal processor 62 (hereinafter referred to as DSP 62).

The AD converter 61 converts the output from the mixer 23 to digital data, and inputs the digital data to the DSP 62. The DSP 62 performs, using a program, the same functions as those of the band pass filter group 26, the signal detector group 27, the signal selector 28, the frequency counter 31, and the speed computing unit 32 as shown in FIG. 5. The details of the program for the DSP 62 are omitted here, but it is possible to apply a Fourir transform to the band pass filter processing, for instance.

In the DSP 62, microprocessors LSI in general use as well as a digital analog processor LSI exclusively used for the DSP 62 can be employed.

Furthermore, the scope of the processing conducted by the program of the DSP 62 is not limited to the scope conducted by the band pass filter group 26 to the speed computing unit 32, but can be selected as desired in accordance with the performances of devices used in the DSP 62.

Thus, the above-mentioned speed measuring apparatus No. 2 of the present invention is capable of measuring the speed of the moving-target which is small in size or positioned far away from the speed measuring apparatus, relative to the speed measuring apparatus, even if the acoustic wave transmitted by the transmitting unit 11 directly enters the receiving unit 21 by diffraction without being reflected by anything, or there are acoustic waves reflected by fixed objects near the moving-target. Furthermore, the initial speed of the ball thrown by a pitcher in base ball can be measured even though a plurality of Doppler-shifted components, for instance, from various parts of the body of the pitcher other than from the ball itself, is received by the receiving unit 21, since such Doppler-shifted components can be separated by the band pass filter group and the output from the band pass filter corresponding to the acoustic wave reflected by the ball can be selectively used for the measurement of the initial speed of the ball.

EXAMPLE 3

Figure 8:
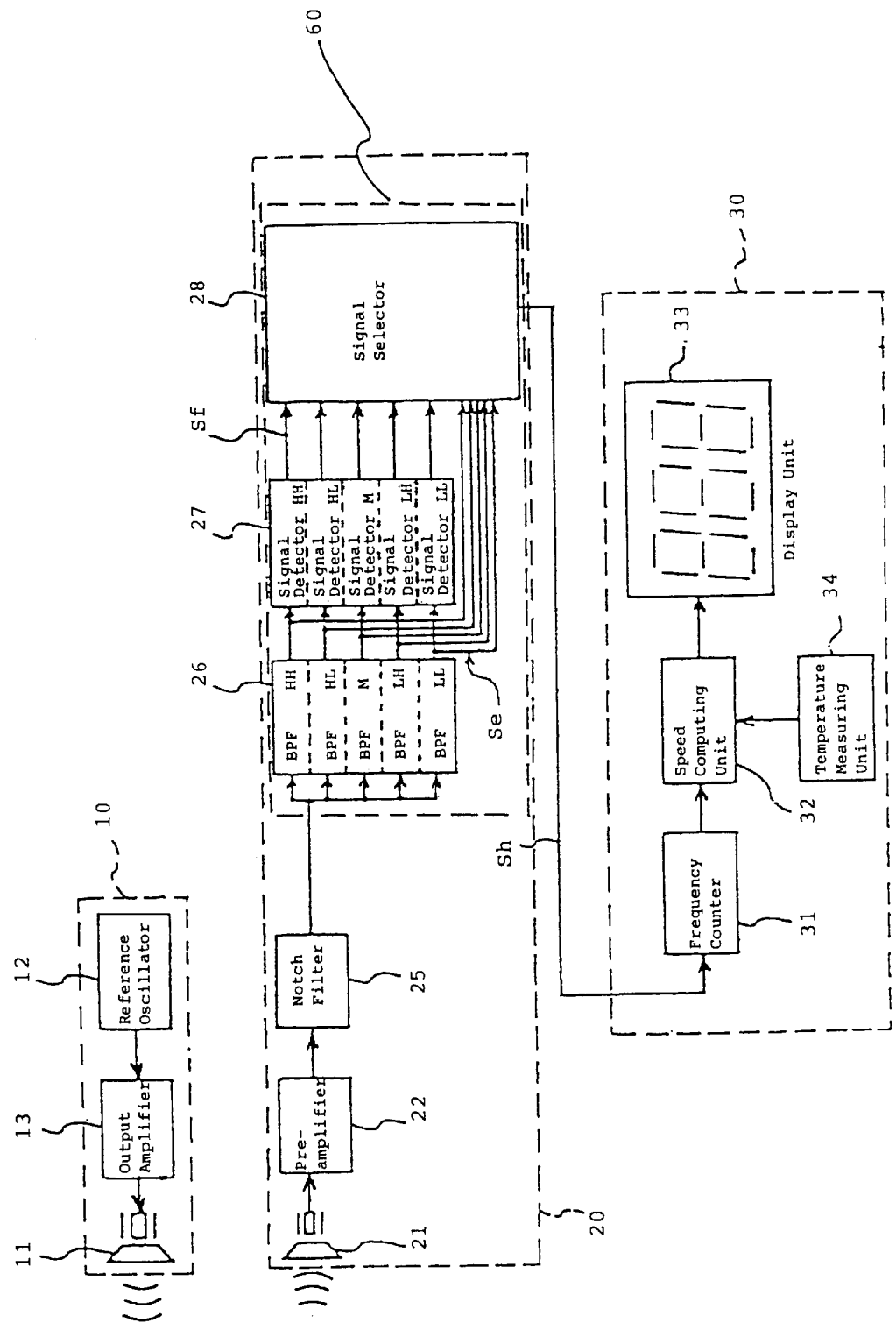
FIG. 8 is a block diagram of a speed measuring apparatus No. 3 of the present invention.

FIG. 8 is a block diagram of a speed measuring apparatus No. 3 of the present invention. In the speed measuring apparatus No. 3, the ultrasonic wave transmitting section 10, part of the ultrasonic wave receiving section 20, and the signal processing section 30 are substantially the same as those in the speed measuring apparatus No. 2 of the present invention as shown in FIG. 5, so that the explanation thereof is omitted.

In the speed measuring apparatus No. 3 of the present invention, the mixer 23 provided in the speed measuring apparatus No. 2 of the present invention as shown in FIG. 5 is not provided, and the signals output from the notch filter 25 are input to the band pass filter group 26. The attenuation degree of the reference signal component by the notch filter 25 is set at an appropriate degree with the dynamic ranges of the band pass filter group 26 and the frequency counter 31 after the notch filter 25 taken into consideration. For example, when the ratio of the level of the reflection wave signal component to the level of the reference signal component at an output side of the pre-amplifier 22 is about 1:1, and the ratio of the level of the reflection wave signal component required for the counting of the frequency thereof by the frequency counter 31 to the level of the noise components containing the reference signal component is 4:1, the attenuation ratio of the reference signal component by the notch filter 25 is set at 1/4, namely −12 dB, provided that when the saturation of the signals at the pre-amplifier 22 becomes a problem, a notch filter may be provided between the receiving unit 21 and the pre-amplifier 22, or a notch filter may be provided both before and after the pre-amplifier 22.

In the speed measuring apparatus using the mixer 23 as shown in FIG. 5, the pass band of the band pass filter group 26 is beat down to a range of 530 Hz to 12.5 kHz. However, in the above-mentioned speed measuring apparatus No. 3 shown in FIG. 8, the band pass filter group 26 may be constructed so as to divide the frequency range of the reflection wave component of 33.3 kHz to 45.7 kHz prior to the beat-down into a plurality of frequency ranges.

Figure 9:
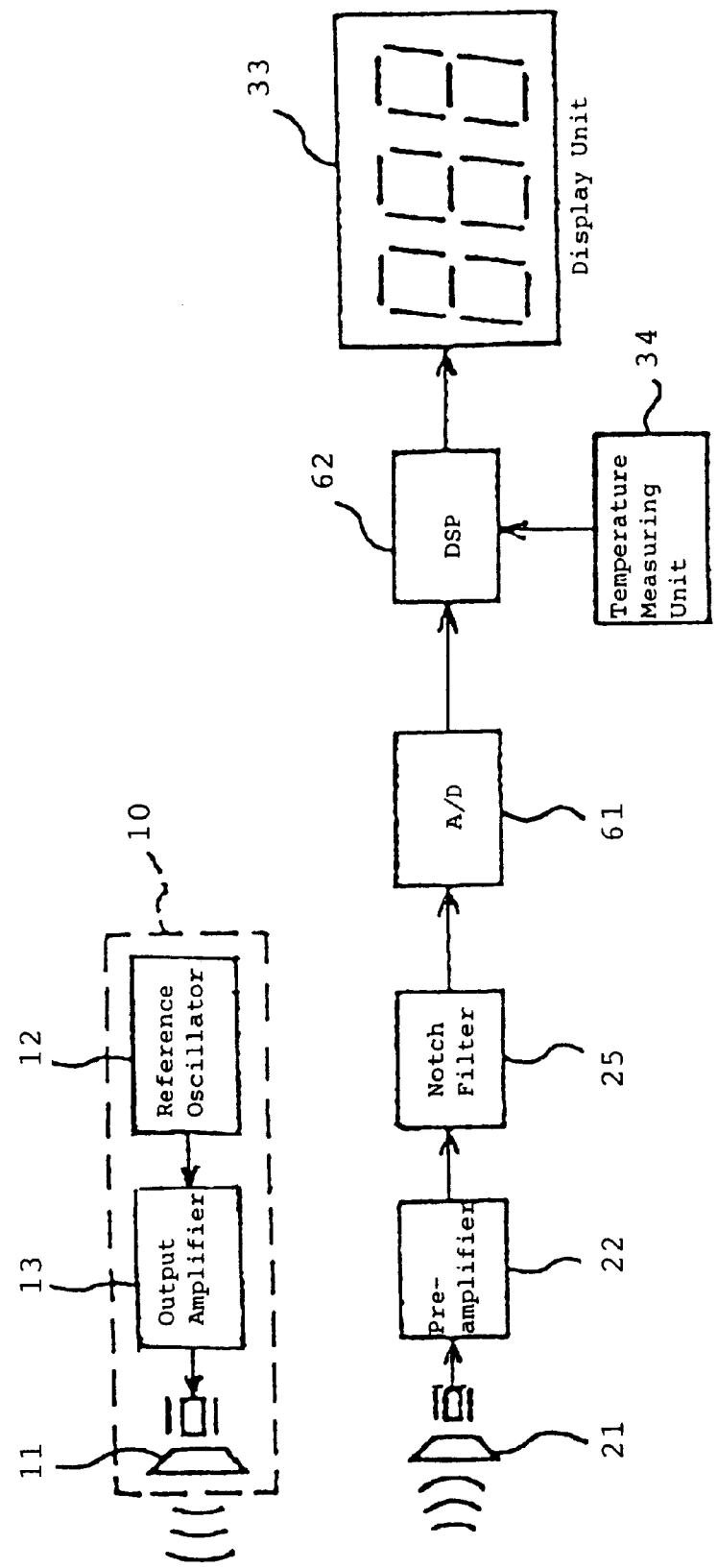
FIG. 9 is a block diagram of another example of the speed measuring apparatus No. 3 of the present invention.

In this speed measuring apparatus, the divided band pass filter means 60 and the signal processing section 30 can be constructed of an analog/digital converter 61 (hereinafter referred to as the AD converter 61) which converts analog signals to digital signals and a digital signal processor 62 (hereinafter referred to as DSP 62) in the same manner as in the case of the speed measuring apparatus shown in FIG. 7. An example of the above structure is shown in FIG. 9.

The AD converter 61 converts the output from the notch filter 25 to digital data, and inputs the digital data to the DSP 62. The DSP 62 performs, using a program, the same functions as those of the band pass filter group 26, the signal detector group 27, the signal selector 28, the frequency counter 31, and the speed computing unit 32 as shown in FIG. 5. The details of the program for the DSP 62 are omitted here, but it is possible to apply a Fourir transform to the band pass filter processing, for instance.

In the DSP 62, microprocessors LSI in general use as well as a digital analog processor LSI exclusively used for the DSP 62 can be employed.

Furthermore, the scope of the processing conducted by the program of the DSP 62 is not limited to the scope conducted by the band pass filter group 26 to the speed computing unit 32, but can be selected as desired in accordance with the performances of devices used in the DSP 62.

Thus, the above-mentioned speed measuring apparatus of the present invention is capable of attaining the same effects as those attained by the speed measuring apparatus No. 3 of the present invention, without using the mixer 23. Furthermore, since no mixer is used in the above-mentioned speed measuring apparatus of the present invention, the Doppler frequency in the case where the moving-target is approaching the speed measuring apparatus and the Doppler frequency in the case where the moving-target-to-the speed measuring apparatus is increasing differ, so that the moving directions of the moving-target can be distinguished. Furthermore, since the speed of the moving-target is measured using the signals before the beating down thereof, the processing time of the signals can be significantly shortened.

EXAMPLE 4

Figure 10:
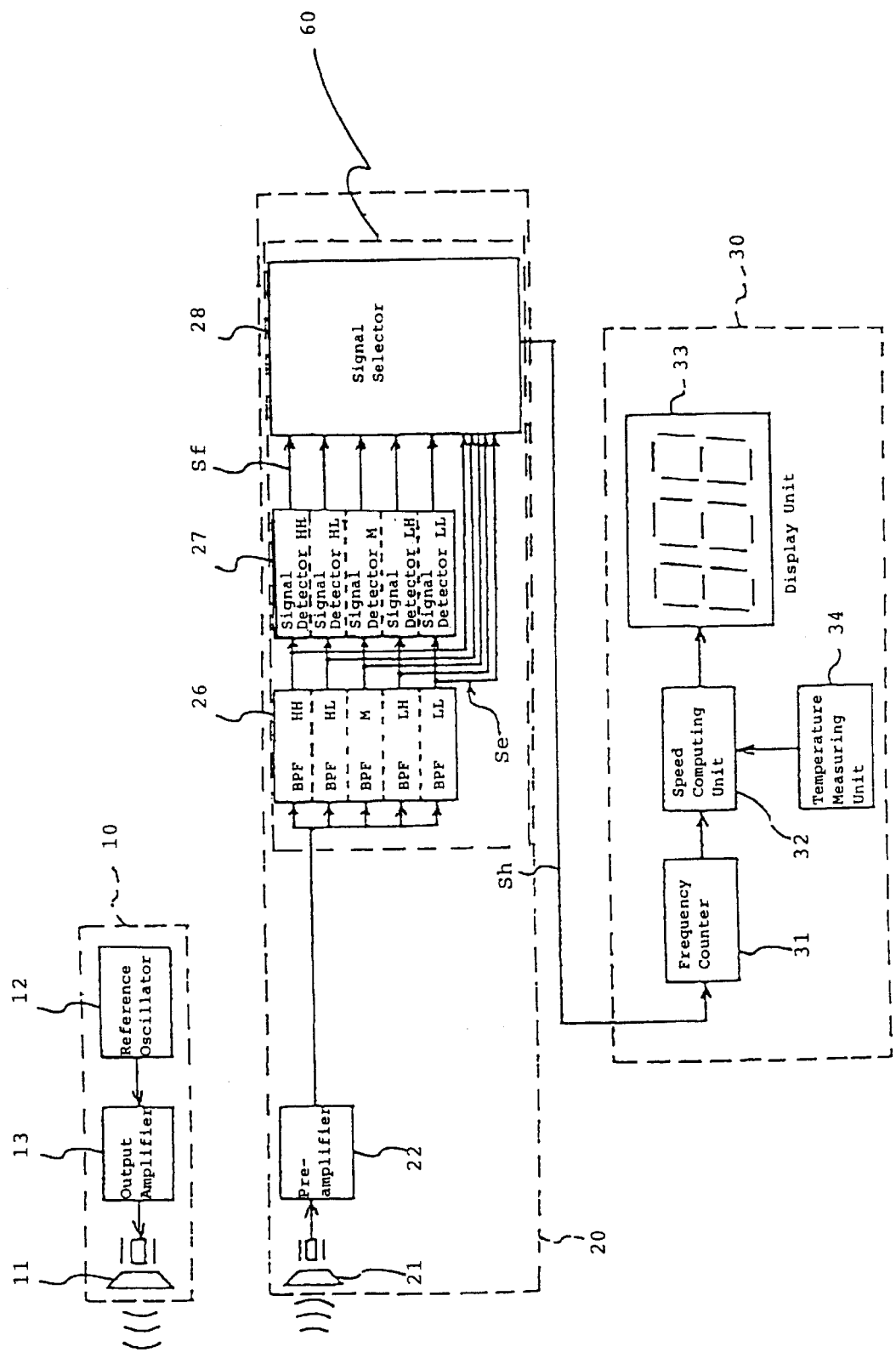
FIG. 10 is a block diagram of a speed measuring apparatus No. 4 of the present invention.

FIG. 10 is a block diagram of a speed measuring apparatus No. 4 of the present invention. In the speed measuring apparatus No. 4, the ultrasonic wave transmitting section 10, part of the ultrasonic wave receiving section 20, and the signal processing section 30 are substantially the same as those in the speed measuring apparatus No. 2 of the present invention as shown in FIG. 5, so that the explanation thereof is omitted.

In the speed measuring apparatus No. 4 of the present invention, the mixer 23 and the notch filter 25 provided in the speed measuring apparatus No. 2 of the present invention as shown in FIG. 5 are not provided, and each of the band pass filters of the band pass filter group 26 is caused to have the same function as that of the notch filter that attenuates the reference signal component with the frequency fo. In other words, the selectivity (Q) of each band pass filter is increased to such an extent that the reference signal component is attenuated to a level by which the frequency counting by the frequency counter 31 is not adversely affected. The attenuation degree of the reference signal component by each band pass filter is set at an appropriate degree with the dynamic range of the frequency counter 31 taken into consideration. For example, when the ratio of the level of the reflection wave signal component to the level of the reference signal component at an output side of the pre-amplifier 22 is about 1:1, and the ratio of the level of the reflection wave signal component required for the counting of the frequency thereof by the frequency counter 31 to the level of the noise components containing the reference signal component is 4:1, the attenuation ratio of the reference signal component by each band pass filter is set at 1/4, namely −12 dB.

It is preferable that the gain of the pre-amplifier 22 be controlled to such an extent that the band pass filter group 26 is not saturated with signals input thereto. An insufficient portion of the gain may be borne by each band pass filter of the band pass filter group 26 as required.

Figure 11:
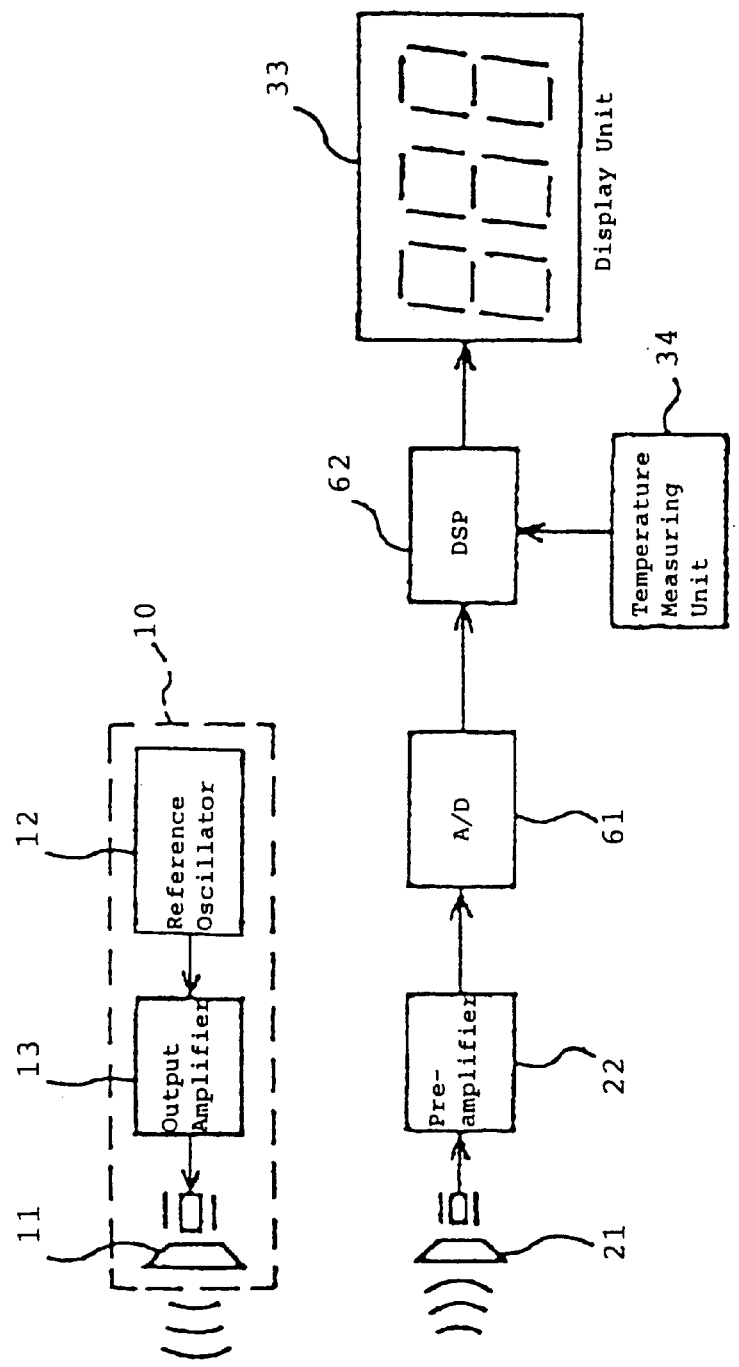
FIG. 11 is a block diagram of another example of the speed measuring apparatus No. 4 of the present invention.
Figure 12:
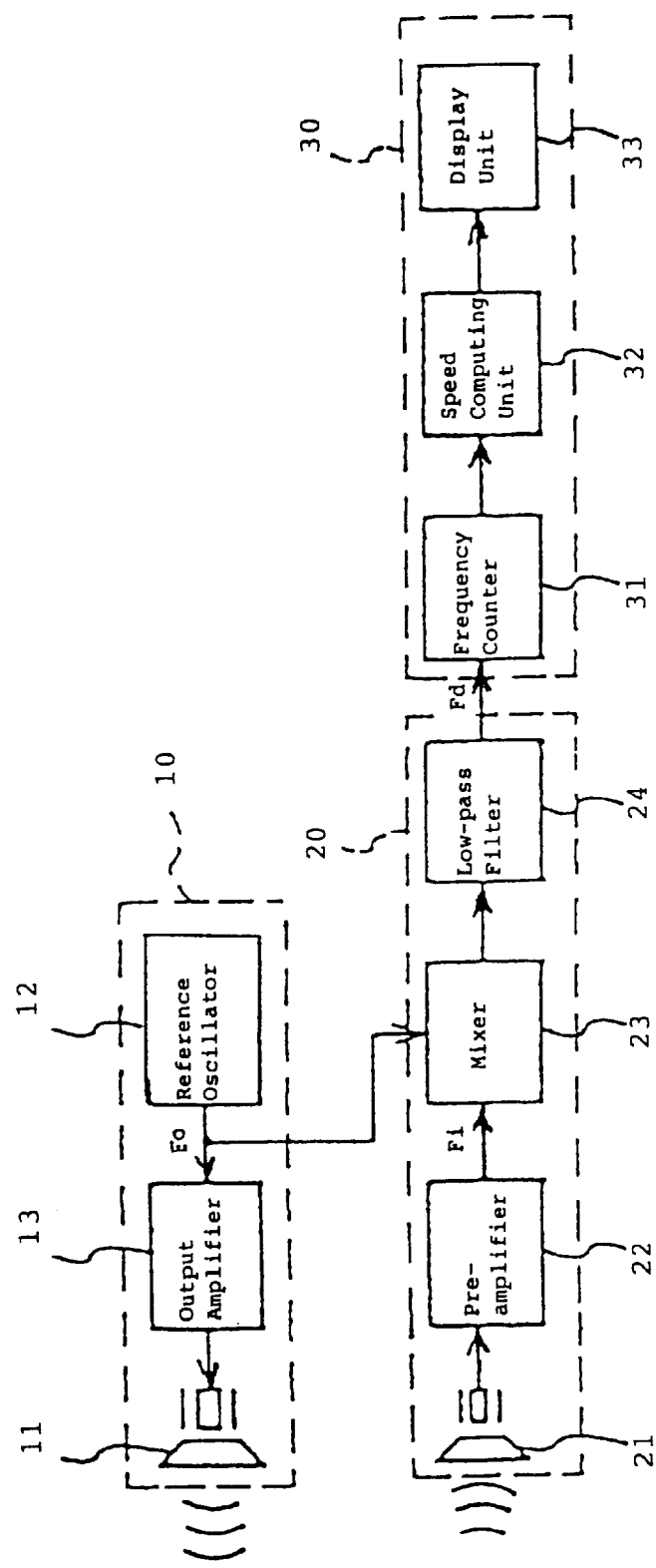
FIG. 12 is a block diagram of an example of a conventional speed measuring apparatus.
Figure 13:
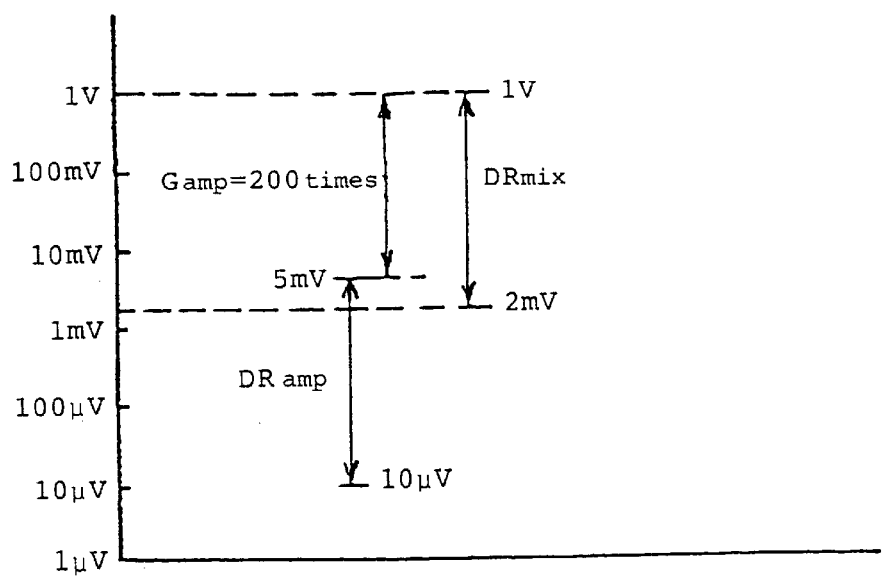
FIG. 13 is a diagram in explanation of the dynamic ranges of a pre-amplifier and a mixer for use in the example shown in FIG. 12.

Even in this speed measuring apparatus, the divided band pass filter means 60 and the signal processing section 30 can be constructed of an analog/digital converter 61 (hereinafter referred to as the AD converter 61) which converts analog signals to digital signals and a digital signal processor 62 (hereinafter referred to as DSP 62) in the same manner as in the case of the speed measuring apparatus shown in FIG. 7 and FIG. 9. An example of the above structure is shown in FIG. 11.

The AD converter 61 converts the output from the pre-amplifier 22 to digital data, and inputs the digital data to the DSP 62. The DSP 62 performs, using a program, the same functions as those of the band pass filter group 26, the signal detector group 27, the signal selector 28, the frequency counter 31, and the speed computing unit 32 as shown in FIG. 5. The details of the program for the DSP 62 are omitted here, but it is possible to apply a Fourir transform to the band pass filter processing, for instance.

In the DSP 62, microprocessors LSI in general use as well as a digital analog processor LSI exclusively used for the DSP 62 can be employed.

Furthermore, the scope of the processing conducted by the program of the DSP 62 is not limited to the scope conducted by the band pass filter group 26 to the speed computing unit 32, but can be selected as desired in accordance with the performances of devices used in the DSP 62.

Thus, the above-mentioned speed measuring apparatus of the present invention is capable of attaining the same effects as those attained by the speed measuring apparatus No. 4 of the present invention, without the mixer 23 or the notch filter being independently provided.

In the speed measuring apparatus No. 1 to No. 4 in Examples 1 to 4 of the present invention, the apparatus is explained by using the ball for use in base ball as an example of the moving-target for measuring the speed thereof by transmitting an ultrasonic wave toward the moving-target. However, the moving-target for use in the speed measuring apparatus of the present invention is not limited to such a ball. The speed measuring apparatus of the present invention can be attached to a moving object such as a car so as to measure the speed of the moving object relative to a fixed object such a road, along or on which the moving object runs.

The wave transmitting means and the signal processing means are not limited to such structures as constructed of the ultrasonic wave transmitting section 10 and the signal processing section 30 as in each of the above-mentioned examples of the speed measuring apparatus of the present invention, but other transmitting means and signal processing means can be used in the present invention.

Furthermore, in the explanation of the speed measuring apparatus No. 1 to No. 4 in Examples 1 to 4 of the present invention, operation means for operating the speed measuring apparatus and display means for displaying the measured speed are not explained in detail. However, these means can, of course, be provided in the speed measuring apparatus, or external interface means can be employed in place of such operation means and display means. When the speed measuring apparatus of the present invention is used in combination with such external interface means, using a computer, remote control of the speed measuring apparatus and/or remote speed measuring or monitoring can be performed. The measured results can also be stored in such computer. For the remote control and remote monitoring, not only computers, but exclusive control unit, monitoring unit and apparatus can be employed. Specific examples of the external interface means include RS232 in general use and centronics, but are not limited to such devices.

Japanese Patent Application No. 09-340669 filed Nov. 26, 1997, Japanese Patent Application No. 10-098411 filed Mar. 26, 1998, Japanese Patent Application No. 10-128319 filed Apr. 22, 1998, and Japanese Patent Application No. 10-198012 filed Jun. 29, 1998 are hereby incorporated by references.

What is claimed is:

1. A speed measuring apparatus comprising:
   transmitting means for transmitting an acoustic reference wave toward a moving-target, said acoustic reference wave being generated based on a reference signal with a predetermined frequency;
   receiving means for receiving acoustic reflection waves which are generated by said transmitted acoustic reference wave being reflected by said moving-target, converting said acoustic reflection waves to receiver signals, and outputting said receiver signals therefrom;
   signal attenuating means for selectively attenuating a signal component with the same frequency as the frequency of said reference signal, corresponding to the acoustic wave which directly enters said receiving means from said transmitting means by diffraction, and/or the acoustic waves reflected by fixed objects, in said receiver signals which are output from said receiving means and outputting signals therefrom;

band pass filter means for selecting at least one Doppler signal component from said signals output from said signal attenuating means; and speed computing means for computing the speed of said moving-target relative to said speed measuring apparatus, based on said Doppler signal component selected by said band pass filter means.

2. The speed measuring apparatus as claimed in claim 1, wherein said band pass filter means comprises at least one band pass filter which selectively allows said Doppler signal component to pass therethrough, and when said band pass filter means comprises a plurality of such band pass filters, said band pass filters are connected in parallel.

3. The speed measuring apparatus as claimed in claim 1, wherein said transmitting means comprises (a) a transmitting unit for transmitting said acoustic reference wave toward said moving-target, (b) a capacitor connected to said transmitting unit in parallel therewith, and (c) an inductive impedance element, thereby constituting a serial resonance circuit, with an inductance of said inductive impedance element being set in such a manner that a resonance frequency of said serial resonance circuit is equal to the frequency of said reference signal.

4. A speed measuring apparatus comprising:

transmitting means for transmitting an acoustic reference wave toward a moving-target, said acoustic reference wave being generated based on a reference signal with a predetermined frequency;

receiving means for receiving acoustic reflection waves which are generated by said transmitted acoustic reference wave being reflected by said moving-target, converting said acoustic reflection waves to receiver signals, and outputting said receiver signals;

band pass filter means for selectively attenuating a signal component with the same frequency as the frequency of said reference signal, corresponding to the acoustic wave which directly enters said receiving means from said transmitting means by diffraction, and/or the acoustic waves reflected by fixed objects, in said receiver signals which are output from said receiving means and outputting signals therefrom, and for selecting at least one Doppler signal component from said receiver signals output from said receiving means; and speed computing means for computing the speed of said moving-target relative to said speed measuring apparatus, based on said Doppler signal component selected by said band pass filter means.

5. The speed measuring apparatus as claimed in claim 4, wherein said band pass filter means comprises at least one band pass filter which selectively allows said Doppler signal component to pass therethrough, and when said band pass filter means comprises a plurality of such band pass filters, said band pass filters are connected in parallel.

6. The speed measuring apparatus as claimed in claim 4, wherein said transmitting means comprises (a) a transmitting unit for transmitting said acoustic reference wave toward said moving-target, (b) a capacitor connected to said transmitting unit in parallel therewith, and (c) an inductive impedance element, thereby constituting a serial resonance circuit, with an inductance of said inductive impedance element being set in such a manner that a resonance frequency of said serial resonance circuit is equal to the frequency of said reference signal.

7. A speed measuring apparatus comprising:

transmitting means for transmitting an acoustic reference wave toward a moving-target, said acoustic reference wave being generated based on a reference signal with a predetermined frequency;

receiving means for receiving acoustic reflection waves which are generated by said transmitted acoustic reference wave being reflected by said moving-target, converting said acoustic reflection waves to receiver signals, and outputting said receiver signal;

signal attenuating means for selectively attenuating a signal component with the same frequency as the frequency of said reference signal, corresponding to the acoustic wave which directly enters said receiving means from said transmitting means by diffraction, and/or the acoustic waves reflected by fixed objects, in said receiver signals which are output from said receiving means and outputting signals therefrom;

analog-to-digital converting means for converting said signals output from said signal attenuating means to digital data, and outputting said digital data; and digital signal processing means for selecting at least one Doppler signal component from said digital data output from said analog-to-digital converting means and computing the speed of said moving-target relative to said speed measuring apparatus, based on said Doppler signal component selected.

8. The speed measuring apparatus as claimed in claim 7, wherein said transmitting means comprises (a) a transmitting unit for transmitting said acoustic reference wave toward said moving-target, (b) a capacitor connected to said transmitting unit in parallel therewith, and (c) an inductive impedance element, thereby constituting a serial resonance circuit, with an inductance of said inductive impedance element being set in such a manner that a resonance frequency of said serial resonance circuit is equal to the frequency of said reference signal.

9. A speed measuring apparatus comprising:

a transmitter configured to transmit an acoustic reference wave toward a moving-target, said acoustic reference wave being generated based on a reference signal with a predetermined frequency;

a receiver configured to receive acoustic reflection waves which are generated by said transmitted acoustic reference wave being reflected by said moving-target, to convert said acoustic reflection waves to receiver signals, and to output said receiver signals therefrom;

a signal attenuator configured to selectively attenuate a signal component with the same frequency as the frequency of said reference signal, corresponding to the acoustic wave which directly enters said receiver from said transmitter by diffraction, and/or the acoustic output signals therefrom;

at least one band pass filter configured to select at least one Doppler signal component from said signals output from said signal attenuator; and a speed computing unit configured to compute the speed of said moving-target relative to said speed measuring apparatus, based on said Doppler signal component measured by said at least one band pass filter.

10. The speed measuring apparatus as claimed in claim 9, wherein said at least one band pass filter selectively allows said Doppler signal component to pass therethrough, and when said at least one band pass filter comprises a plurality of band pass filters, said plurality of band pass filters are connected in parallel.

11. The speed measuring apparatus as claimed in claim 9, wherein said transmitter comprises (a) transmitting unit configured to transmit said acoustic reference wave toward said moving-target, (b) a capacitor connected to said transmitting unit in parallel therewith, and (c) an inductive impedence element, thereby constituting a serial resonance frequency of said serial resonance circuit is equal to the frequency of said reference signal.

12. A speed measuring apparatus comprising:

a transmitter configured to transmit an acoustic reference wave toward a moving-target, said acoustic reference wave being generated based on a reference signal with a predetermined frequency;

a receiver configured to receive acoustic reflection waves which are generated by said transmitted acoustic reference wave being reflected by said moving-target, to convert said acoustic reflection waves to receiver signals, and to output said receiver signals;

at least one band pass filter configured to selectively attenuate a signal component with the same frequency as the frequency of said reference signal, corresponding to the acoustic wave which directly enters said receiver from said transmitter by diffraction, and/or the acoustic waves reflected by fixed objects, in said receiver signals which are output from said receiver and to output signals therefrom, and to select at least one Doppler signal component from said receiver signals output from said receiver; and a speed computing unit configured to compute the speed of said moving-target relative to said speed measuring apparatus, based on said Doppler signal component selected by said at least one band pass filter.

13. The speed measuring apparatus as claimed in claim 12, wherein said at least one band pass filter selectively allows said Doppler signal component to pass therethrough, and when said at least one band pass filter comprises a plurality of band pass filters, said plurality of band pass filters are connected in parallel.

14. The speed measuring apparatus as claimed in claim 12, wherein said transmitter comprises (a) transmitting unit configured to transmit said acoustic reference wave toward said moving-target, (b) a capacitor connected to said transmitting unit in parallel therewith, and (c) an inductive impedance element, thereby constituting a serial resonance circuit, with an inductance of said inductive impedance element being set so that a resonance frequency of said serial resonance circuit is equal to the frequency of said reference signal.

15. A speed measuring apparatus comprising:

a transmitter configured to transmit an acoustic reference wave toward a moving-target, said acoustic reference wave being generated based on a reference signal with a predetermined frequency;

a receiver configured to transmit an acoustic reflection waves which are generated by said transmitted acoustic reference wave being reflected by said moving-target, to convert said acoustic reflection waves to receiver signals, and to output from said receiver and to output signals therefrom;

an analog-to-digital converting unit configured to convert said signals output from said signal attenuator to digital data, and to output said digital data; and a digital signal processor configured to select at least on Doppler signal component from said digital data output from said analog-to-digital converting unit and to compute the speed of said moving-target relative to said speed measuring apparatus, based on said measured Doppler signal component.

16. The speed measuring apparatus as claimed in claim 15, wherein said transmitter comprises (a) a transmitting unit configured to transmit said acoustic reference wave toward said moving-target, (b) a capacitor connected to said transmitting unit in parallel therewith, and (c) an inductive impedance element, thereby constituting a serial resonance circuit, with an inductance of said inductive impedance element being set so that a resonance frequency of said serial resonance circuit is equal to the frequency of said reference signal.

* * * * *

UNITED STATES PATENT AND TRADEMARK OFFICE
CERTIFICATE OF CORRECTION

PATENT NO. : 6,272,071 B1
DATED : August 7, 2001
INVENTOR(S) : Takai et al.

It is certified that error appears in the above-identified patent and that said Letters Patent is hereby corrected as shown below:

Column 2,
Line 45, change "acousticwaves" to -- acoustic waves --.

Column 4,
Line 11, change "is" to -- are --;
Line 42, change "byt" to -- by --.

Column 5,
Line 53, change "combinded" to -- combined --.

Column 6,
Line 24, change "base ball" to -- baseball --.

Column 11,
Line 48, change "base ball" to -- baseball --.

Column 12,
Line 36, change "base ball" to -- baseball --.

Column 13,
Line 46, change "base ball" to -- baseball --.

Column 16,
Line 8, change "base ball" to -- baseball --.
Line 16, after "such", insert -- as --.

Column 18,
Line 49, after "acoustic", insert -- waves reflected by fixed objects, in said receiver signals output from said receiver, and to --;
Line 65, after "(a)", insert -- a --.

Column 19,
Line 4, after "resonance", insert -- circuit, with an inductance of said inductive impedance element being set so that a resonance --;
Line 37, after "(a)", insert -- a --.

UNITED STATES PATENT AND TRADEMARK OFFICE
CERTIFICATE OF CORRECTION

PATENT NO.   : 6,272,071 B1
DATED        : August 7, 2001
INVENTOR(S)  : Takai et al.

It is certified that error appears in the above-identified patent and that said Letters Patent is hereby corrected as shown below:

Column 20,
Line 12, change "transmit an" to -- receive --;
Line 16, delete "from" and "and to output";
Line 17, delete "therefrom";
Between lines 17 and 18, insert -- a signal attenuator configured to selectively attenuate a signal component with the same frequency as the frequency of said reference signal, corresponding to the acoustic wave which directly enters said receiver from said transmitter by diffraction, and/or the acoustic waves reflected by fixed objects, in said receiver signals which are output from said receiver and to output signals therefrom --.

Signed and Sealed this

Fourth Day of June, 2002

*Attest:*

*Attesting Officer*

JAMES E. ROGAN
*Director of the United States Patent and Trademark Office*